(12) United States Patent
Pollack et al.

(10) Patent No.: US 10,843,580 B2
(45) Date of Patent: Nov. 24, 2020

(54) SYSTEMS AND METHODS FOR SMART CHARGING TECHNIQUES, VALUE AND GUARANTEE

(71) Applicant: GridPoint, Inc., Reston, VA (US)

(72) Inventors: Seth B. Pollack, Seattle, WA (US);
Seth W. Bridges, Seattle, WA (US)

(73) Assignee: GridPoint, Inc., Reston, VA (US)

( * ) Notice: Subject to any disclaimer, the term of this patent is extended or adjusted under 35 U.S.C. 154(b) by 134 days.

(21) Appl. No.: 13/731,320

(22) Filed: Dec. 31, 2012

(65) Prior Publication Data

US 2013/0184886 A1 Jul. 18, 2013
US 2019/0250649 A9 Aug. 15, 2019

Related U.S. Application Data

(63) Continuation-in-part of application No. 12/839,235, filed on Jul. 19, 2010, now abandoned, and a
(Continued)

(51) Int. Cl.
*B60L 53/14* (2019.01)
*B60L 55/00* (2019.01)
(Continued)

(52) U.S. Cl.
CPC ............. *B60L 53/14* (2019.02); *B60L 53/305* (2019.02); *B60L 53/63* (2019.02); *B60L 53/64* (2019.02);
(Continued)

(58) Field of Classification Search
CPC .. G05D 11/00; B60L 11/1848; B60L 11/1842; B60L 11/184; B60L 11/1824;
(Continued)

(56) References Cited

U.S. PATENT DOCUMENTS

2009/0091291 A1* 4/2009 Woody ..................... B60K 6/48
320/109
2010/0019726 A1* 1/2010 Kumar .................. B60L 3/0046
320/125
(Continued)

*Primary Examiner* — Thomas C Lee
*Assistant Examiner* — Michael Tang
(74) *Attorney, Agent, or Firm* — Bookoff McAndrews, PLLC

(57) ABSTRACT

A system and methods that enables smart charging for electric resources. A charging behavior guarantee may comprise a guaranteed charging schedule that matches a regular charging schedule of an electric resource and provides power flow flexibility. A smart charging method may also include periodically updated schedules and may manage electric resources via a smart charging benefit analysis. A smart charging method may manage the charging behavior of the electric resources on a grid based on the smart charging benefit. Further, a smart charging method may manage electric resources via a smart charging benefit analysis and smart charging customer guarantees. A smart charging method also may include schedules with overrides, and may involve a method for local load management in the presence of uncontrolled loads. A smart charging method for managing electric resources may also provide direct control over prices-to-devices enabled devices.

18 Claims, 16 Drawing Sheets

Related U.S. Application Data continuation-in-part of application No. 12/839,239, filed on Jul. 19, 2010, now Pat. No. 8,346,401.

(60) Provisional application No. 61/226,497, filed on Jul. 17, 2009.

(51) Int. Cl.

| | |
|---|---|
| *B60L 53/65* | (2019.01) |
| *B60L 53/30* | (2019.01) |
| *B60L 53/64* | (2019.01) |
| *G06Q 50/06* | (2012.01) |
| *B60L 53/63* | (2019.01) |
| *B60L 53/68* | (2019.01) |
| *B60L 53/66* | (2019.01) |
| *G06Q 30/02* | (2012.01) |
| *H02J 7/00* | (2006.01) |
| *G05D 11/00* | (2006.01) |
| *H02J 3/38* | (2006.01) |

(52) U.S. Cl.
CPC ............ *B60L 53/65* (2019.02); *B60L 53/665* (2019.02); *B60L 53/68* (2019.02); *B60L 55/00* (2019.02); *G05D 11/00* (2013.01); *G06Q 30/0208* (2013.01); *G06Q 50/06* (2013.01); *H02J 7/0071* (2020.01); *B60L 2240/70* (2013.01); *H02J 3/38* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y04S 50/14* (2013.01)

(58) Field of Classification Search
CPC ..... H02J 7/041; G06Q 50/06; G06Q 30/0208; Y02T 10/7291; Y02T 90/121; Y02T 90/163; Y02T 90/16; Y02T 90/128; Y02T 90/169; Y04S 10/54
USPC ........................................................ 700/291
See application file for complete search history.

(56) References Cited

U.S. PATENT DOCUMENTS

| | | | | |
|---|---|---|---|---|
| 2010/0076825 | A1* | 3/2010 | Sato | B60L 3/12 702/63 |
| 2010/0082277 | A1* | 4/2010 | Ballard | B60L 11/1809 702/63 |
| 2010/0289451 | A1* | 11/2010 | Tuffner | H02J 7/34 320/109 |
| 2011/0025258 | A1* | 2/2011 | Kim | H02J 7/0013 320/106 |

\* cited by examiner

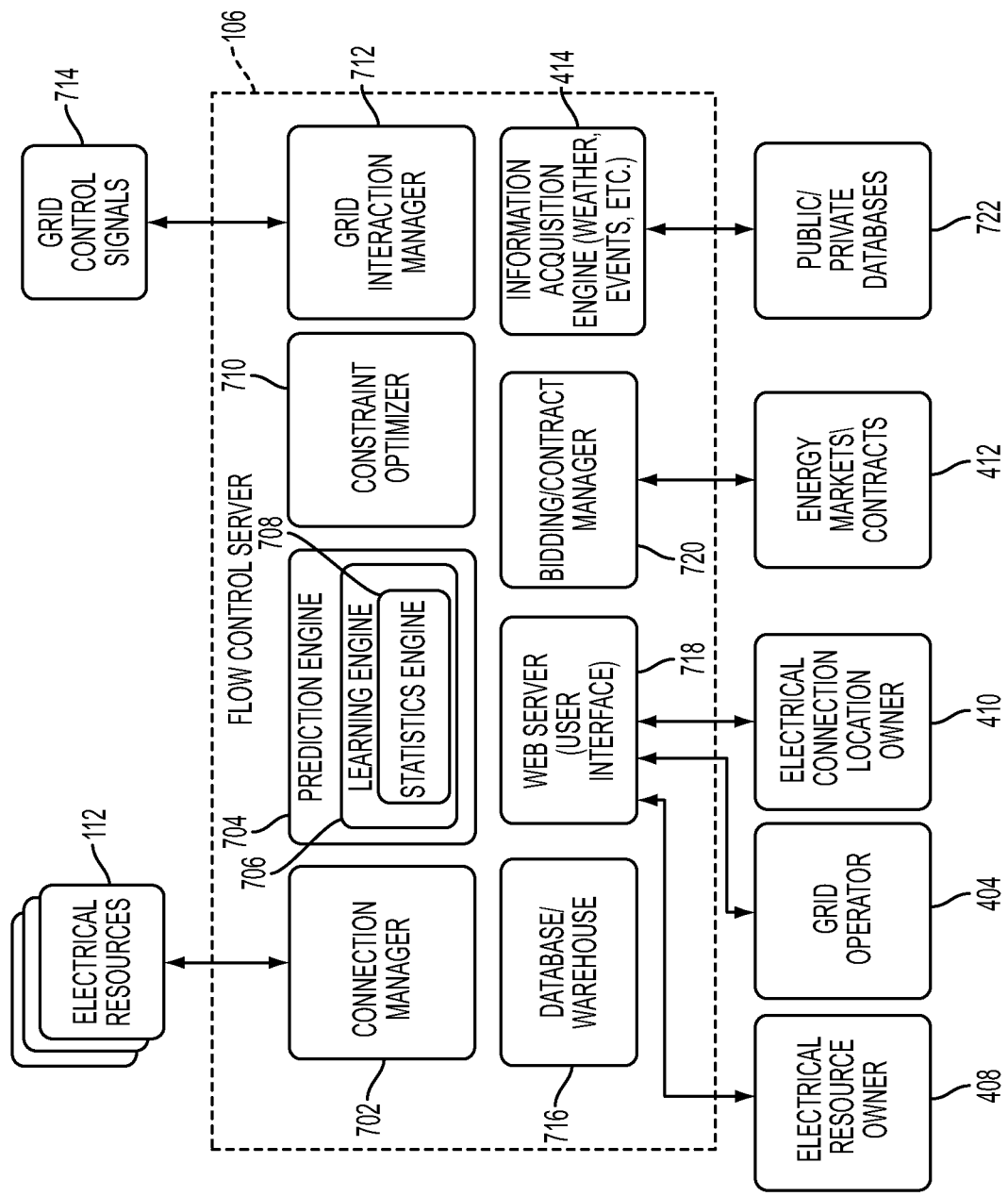

SYSTEMS AND METHODS FOR SMART CHARGING TECHNIQUES, VALUE AND GUARANTEE

This application is a continuation in part of U.S. application Ser. No. 12/839,235 entitled "SYSTEM AND METHODS FOR SMART CHARGING TECHNIQUES" filed Jul. 19, 2010 and is also a continuation-in-part of U.S. application Ser. No. 12/839,239 entitled "SMART CHARGING VALUE AND GUARANTEE APPLICATION" filed Jul. 19, 2010, both of which claim priority to Provisional Patent Application No. 61/226,497 filed Jul. 17, 2009. The entire disclosures of both applications are incorporated herein by reference. This application also incorporates herein by reference the following: U.S. Provisional Patent Application No. 61/256,278 filed Oct. 29, 2009; U.S. patent application Ser. No. 12/751,837 filed on Mar. 31, 2010; U.S. patent application Ser. No. 12/751,845 filed on Mar. 31, 2010; U.S. patent application Ser. No. 12/751,851 filed on Mar. 31, 2010; U.S. patent application Ser. No. 12/751,852 filed on Mar. 31, 2010; U.S. patent application Ser. No. 12/751,853 filed on Mar. 31, 2010; U.S. patent application Ser. No. 12/751,862 filed on Mar. 31, 2010; U.S. patent application Ser. No. 12/252,657 filed Oct. 16, 2008; U.S. patent application Ser. No. 12/252,209 filed Oct. 15, 2008; U.S. patent application Ser. No. 12/252,803 filed Oct. 16, 2008; and U.S. patent application Ser. No. 12/252,950 filed Oct. 16, 2008.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of charging systems for electrical storage devices, and in particular to novel systems and methods for smart charging and charging distributed loads, such as a multitude of electric vehicle batteries.

BACKGROUND OF THE INVENTION

Low-level electrical and communication interfaces to enable charging and discharging of electric vehicles with respect to the grid is described in U.S. Pat. No. 5,642,270 to Green et al., entitled, "Battery powered electric vehicle and electrical supply system," incorporated herein by reference. The Green reference describes a bi-directional charging and communication system for grid-connected electric vehicles.

Current power flow management systems have a number of drawbacks. Simple timer systems merely delay charging to a fixed off-peak time. There is a need for the implementation of charge patterns for electric vehicles that provide a satisfactory level of flexibility, control and convenience to electric vehicle owners. Purely schedule-based system cannot address unpredictable operational demands.

Significant opportunities for improvement exist in managing power flow at the customer level. Modern electric vehicles could benefit in a variety of ways from a smart charging program that provides electric vehicle owners with guarantees, updates, benefit analysis, and overrides that assist vehicle owners while coordinating the charging activities of a number of vehicles in an efficient manner.

SUMMARY OF THE INVENTION

An embodiment for a method for managing electric resources with smart charging customer guarantees includes determining a charging behavior guarantee for a electric resource. The charging behavior guarantee may comprise a guaranteed charging schedule that matches a regular charging schedule of the electric resource. The guaranteed charging schedule provides power flow flexibility. The method includes transmitting the charging behavior guarantee from a server to the electric resources, managing the charging behavior of electric resources based partially on the guaranteed charging schedule. The management of the charging behavior is performed on a particular machine, which may comprise a physical computing device.

An embodiment for a method for managing electric resources via a smart charging benefit analysis includes determining a smart charging benefit, which is a benefit provided by an energy management system that manages electric resources. The smart charging benefit is a beneficial impact resulting from the energy management system, and the beneficial impact is beneficial to the electric resource. The method further includes transmitting a benefit representation from a server to the electric resource, wherein the benefit representation represents the smart charging benefit, and managing the charging behavior of electric resources based partially on the smart charging benefit. The management of the charging behavior is performed on a particular machine, which may comprise a physical computing device.

Electric vehicles could benefit in a variety of ways from a centrally controlled smart charging system administered by a smart charging server. These benefits may include a reduced cost of electricity, reduced congestion of the electric distribution network, and reduced greenhouse gas emissions.

To work effectively, a smart charging system requires the central control of an outside entity via an external network, such as a server. This server would be responsible for coordinating the charging activities of a large number of vehicles distributed over a wide area, such as a city.

While it would be desirable to establish direct low-latency communications links between the server and each device or vehicle in a smart charging network, practical considerations sometimes preclude such direct connections. By using the correct techniques, a smart charging server could still produce substantial benefits while working within the communications constraints present in a particular locale or installation.

An embodiment of a method for smart charging via periodically updated schedules includes periodically transmitting a charging schedule via a network from a server to electric resources. An electric resource receives the charging schedule via the network from the server. Further, the method includes replacing a prior charging schedule with the received charging schedule, where the replaced prior charging schedule previously controlled the charging behavior for the electric resource.

An embodiment of a method for smart charging via schedules with overrides includes periodically transmitting a default charging schedule via a network from a server to electric resources. An electric resource receives the default charging schedule via the network from the server. The method further includes transmitting a charging schedule override from the server to the a electric resource and overriding the default charging schedule with the charging schedule override. The charging schedule override modifies the charging behavior for electric resource.

An embodiment of a method for local load management in the presence of uncontrolled loads includes receiving, at a server, power levels for electric resources located at a site. The method further includes determining a total power level for electric resources, where the electric resources comprise controlled electric resources and uncontrolled electric resources, determining a controlled power level for the controlled electric resources, where the controlled power level is adjustable via the server; and determining an uncontrolled power level for the uncontrolled electric resources based on the total power level and the controlled power level, where the uncontrolled power level is unadjustable via the server. In addition, the method includes managing the total power level for the electric resources based on these determinations. The management of the total power level is performed on a particular machine, which may comprise a physical computing device.

An embodiment of a method for managing electric resources with direct control over prices-to-devices enabled devices including determining an energy price for electric resources, where the electric resources comprise prices-to-devices enabled electric resources. The prices-to-devices enabled electric resources may have configurable rules for determining charging behavior based an energy price. The method includes adjusting the energy price for a prices-to-devices enabled electric resource and transmitting, from a server, the adjusted energy price to the prices-to-devices enabled electric resource. In addition, the method includes managing the charging behavior for the prices-to-devices enabled electric resource based on the adjusted energy price. The management of the charging behavior is performed on a particular machine, which may comprise a physical computing device.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

FIG. 7 is a block diagram of an example of flow control server.

DETAILED DESCRIPTION OF THE EMBODIMENTS

Figure 1:
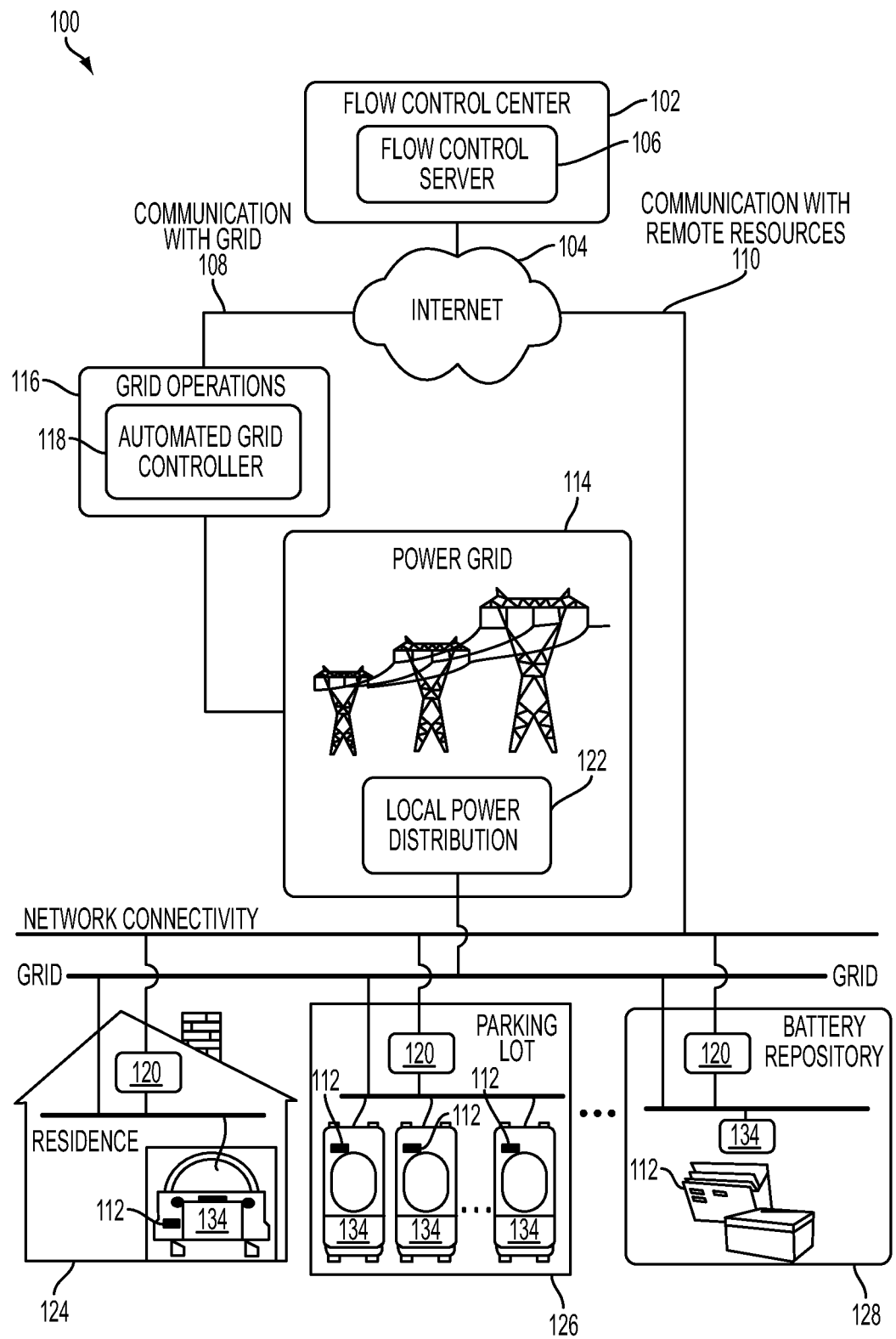
FIG. 1 is a diagram of an example of a power aggregation system.

Reference will now be made in detail to the embodiments of the present invention, examples of which are illustrated in the accompanying drawings.

Overview

Described herein is a power aggregation system for distributed electric resources, and associated methods. In one implementation, a system communicates over the Internet and/or some other public or private networks with numerous individual electric resources connected to a power grid (hereinafter, "grid"). By communicating, the system can dynamically aggregate these electric resources to provide power services to grid operators (e.g. utilities, Independent System Operators (ISO), etc).

"Power services" as used herein, refers to energy delivery as well as other ancillary services including demand response, regulation, spinning reserves, non-spinning reserves, energy imbalance, reactive power, and similar products.

"Aggregation" as used herein refers to the ability to control power flows into and out of a set of spatially distributed electric resources with the purpose of providing a power service of larger magnitude.

"Charge Control Management" as used herein refers to enabling or performing the starting, stopping, or level-setting of a flow of power between a power grid and an electric resource.

"Power grid operator" as used herein, refers to the entity that is responsible for maintaining the operation and stability of the power grid within or across an electric control area. The power grid operator may constitute some combination of manual/human action/intervention and automated processes controlling generation signals in response to system sensors. A "control area operator" is one example of a power grid operator.

"Control area" as used herein, refers to a contained portion of the electrical grid with defined input and output ports. The net flow of power into this area must equal (within some error tolerance) the sum of the power consumption within the area and power outflow from the area, less the power production within in the area.

"Power grid" as used herein means a power distribution system/network that connects producers of power with consumers of power. The network may include generators, transformers, interconnects, switching stations, and safety equipment as part of either/both the transmission system (i.e., bulk power) or the distribution system (i.e. retail power). The power aggregation system is vertically scalable for use within a neighborhood, a city, a sector, a control area, or (for example) one of the eight large-scale Interconnects in the North American Electric Reliability Council (NERC).

Moreover, the system is horizontally scalable for use in providing power services to multiple grid areas simultaneously.

"Grid conditions" as used herein, refers to the need for more or less power flowing in or out of a section of the electric power grid, in response to one of a number of conditions, for example supply changes, demand changes, contingencies and failures, ramping events, etc. These grid conditions typically manifest themselves as power quality events such as under- or over-voltage events or under- or over-frequency events.

"Power quality events" as used herein typically refers to manifestations of power grid instability including voltage deviations and frequency deviations; additionally, power quality events as used herein also includes other disturbances in the quality of the power delivered by the power grid such as sub-cycle voltage spikes and harmonics.

"Electric resource" as used herein typically refers to electrical entities that can be commanded to do some or all of these three things: take power (act as load), provide power (act as power generation or source), and store energy. Examples may include battery/charger/inverter systems for electric or hybrid-electric vehicles, repositories of used-but-serviceable electric vehicle batteries, fixed energy storage, fuel cell generators, emergency generators, controllable loads, etc.

"Electric vehicle" is used broadly herein to refer to pure electric and hybrid electric vehicles, such as plug-in hybrid electric vehicles (PHEVs), especially vehicles that have significant storage battery capacity and that connect to the power grid for recharging the battery. More specifically, electric vehicle means a vehicle that gets some or all of its energy for motion and other purposes from the power grid. Moreover, an electric vehicle has an energy storage system, which may consist of batteries, capacitors, etc., or some combination thereof. An electric vehicle may or may not have the capability to provide power back to the electric grid.

Electric vehicle "energy storage systems" (batteries, super capacitors, and/or other energy storage devices) are used herein as a representative example of electric resources intermittently or permanently connected to the grid that can have dynamic input and output of power. Such batteries can function as a power source or a power load. A collection of aggregated electric vehicle batteries can become a statistically stable resource across numerous batteries, despite recognizable tidal connection trends (e.g., an increase in the total number of vehicles connected to the grid at night; a downswing in the collective number of connected batteries as the morning commute begins, etc.) Across vast numbers of electric vehicle batteries, connection trends are predictable and such batteries become a stable and reliable resource to call upon, should the grid or a part of the grid (such as a person's home in a blackout) experience a need for increased or decreased power. Data collection and storage also enable the power aggregation system to predict connection behavior on a per-user basis.

An Example of the Presently Disclosed System

FIG. 1 shows a power aggregation system 100. A flow control center 102 is communicatively coupled with a network, such as a public/private mix that includes the Internet 104, and includes one or more servers 106 providing a centralized power aggregation service. "Internet" 104 will be used herein as representative of many different types of communicative networks and network mixtures (e.g., one or more wide area networks—public or private—and/or one or more local area networks). Via a network, such as the Internet 104, the flow control center 102 maintains communication 108 with operators of power grid(s), and communication 110 with remote resources, i.e., communication with peripheral electric resources 112 ("end" or "terminal" nodes/devices of a power network) that are connected to the power grid 114. In one implementation, power line communicators (PLCs), such as those that include or consist of Ethernet-over-power line bridges 120 are implemented at connection locations so that the "last mile" (in this case, last feet—e.g., in a residence 124) of Internet communication with remote resources is implemented over the same wire that connects each electric resource 112 to the power grid 114. Thus, each physical location of each electric resource 112 may be associated with a corresponding Ethernet-over-power line bridge 120 (hereinafter, "bridge") at or near the same location as the electric resource 112. Each bridge 120 is typically connected to an Internet access point of a location owner, as will be described in greater detail below. The communication medium from flow control center 102 to the connection location, such as residence 124, can take many forms, such as cable modem, DSL, satellite, fiber, WiMax, etc. In a variation, electric resources 112 may connect with the Internet by a different medium than the same power wire that connects them to the power grid 114. For example, a given electric resource 112 may have its own wireless capability to connect directly with the Internet 104 or an Internet access point and thereby with the flow control center 102.

Electric resources 112 of the power aggregation system 100 may include the batteries of electric vehicles connected to the power grid 114 at residences 124, parking lots 126 etc.; batteries in a repository 128, fuel cell generators, private dams, conventional power plants, and other resources that produce electricity and/or store electricity physically or electrically.

In one implementation, each participating electric resource 112 or group of local resources has a corresponding remote intelligent power flow (IPF) module 134 (hereinafter, "remote IPF module" 134). The centralized flow control center 102 administers the power aggregation system 100 by communicating with the remote IPF modules 134 distributed peripherally among the electric resources 112. The remote IPF modules 134 perform several different functions, including, but not limited to, providing the flow control center 102 with the statuses of remote resources; controlling the amount, direction, and timing of power being transferred into or out of a remote electric resource 112; providing metering of power being transferred into or out of a remote electric resource 112; providing safety measures during power transfer and changes of conditions in the power grid 114; logging activities; and providing self-contained control of power transfer and safety measures when communication with the flow control center 102 is interrupted. The remote IPF modules 134 will be described in greater detail below.

In another implementation, instead of having an IPF module 134, each electric resource 112 may have a corresponding transceiver (not shown) to communicate with a local charging component (not shown). The transceiver and charging component, in combination, may communicate with flow control center 102 to perform some or all of the above mentioned functions of IPF module 134. A transceiver and charging component are shown in FIG. 2B and are described in greater detail herein.

Figure 2A:
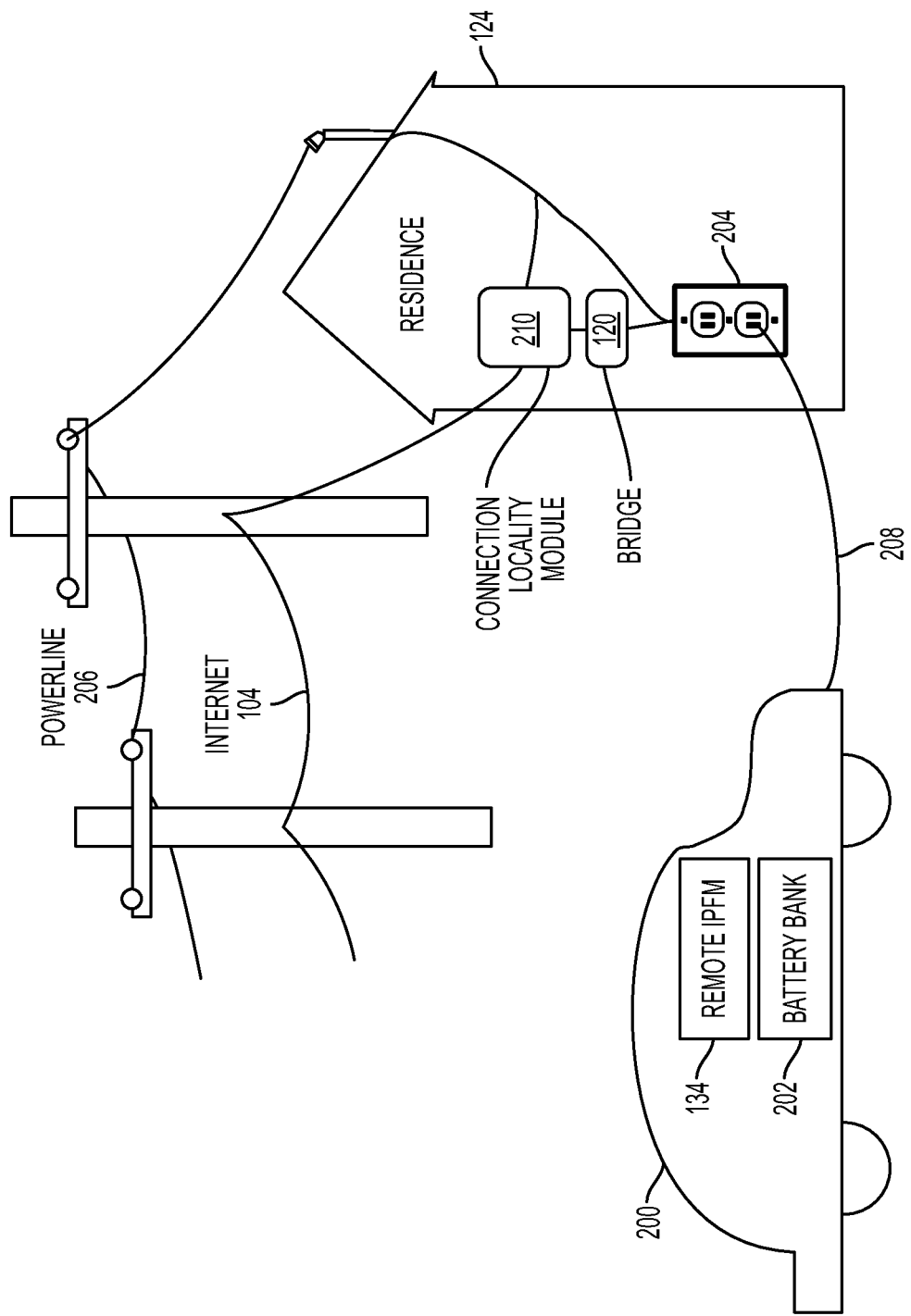
FIGS. 2A-2B are diagrams of an example of connections between an electric vehicle, the power grid, and the Internet.
Figure 2B:
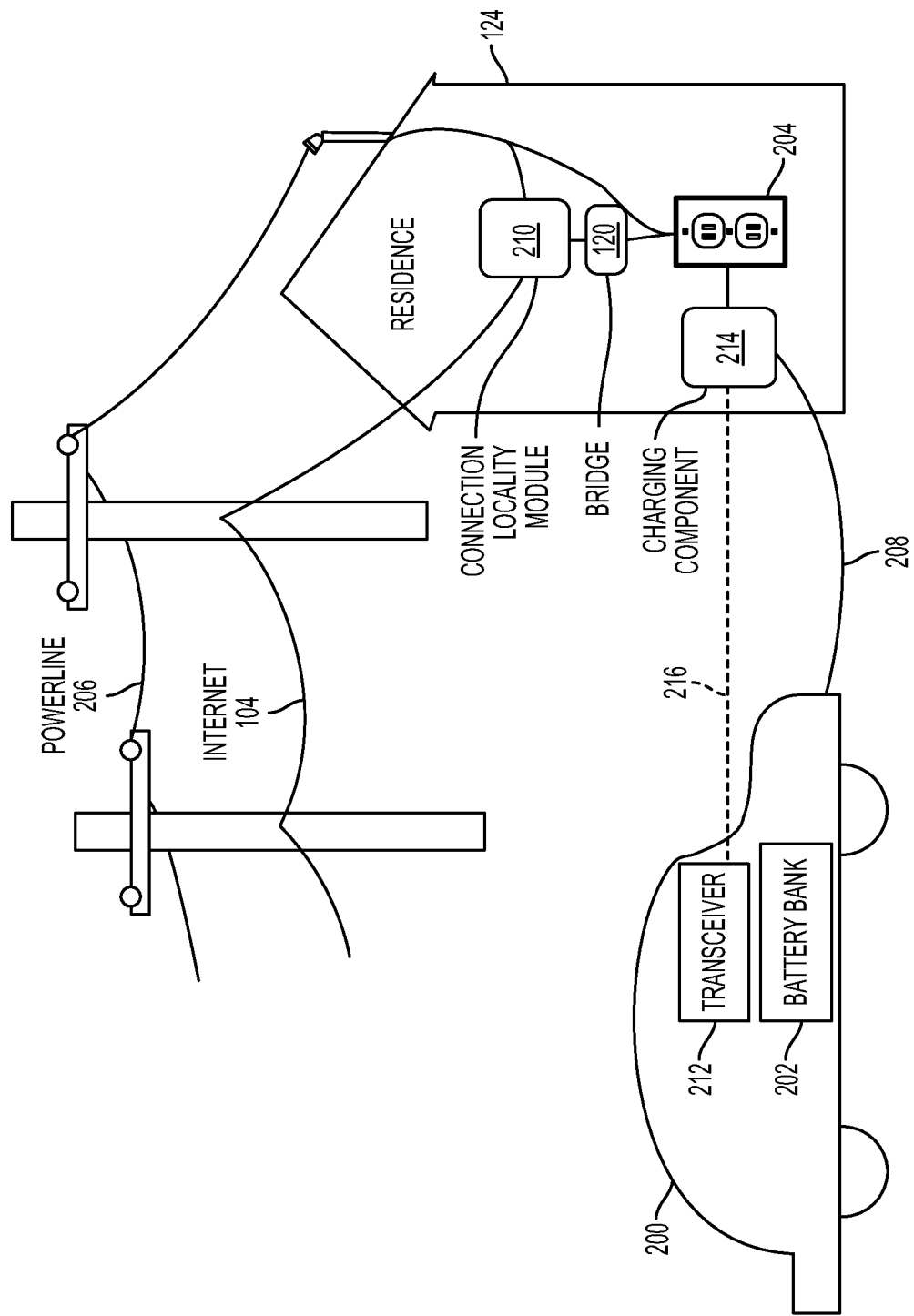

FIG. 2A shows another view of electrical and communicative connections to an electric resource 112. In this example, an electric vehicle 200 includes a battery bank 202 and a remote IPF module 134. The electric vehicle 200 may connect to a conventional wall receptacle (wall outlet) 204 of a residence 124, the wall receptacle 204 representing the peripheral edge of the power grid 114 connected via a residential powerline 206.

In one implementation, the power cord 208 between the electric vehicle 200 and the wall outlet 204 can be composed of only conventional wire and insulation for conducting alternating current (AC) power to and from the electric vehicle 200. In FIG. 2A, a location-specific connection locality module 210 performs the function of network access point—in this case, the Internet access point. A bridge 120 intervenes between the receptacle 204 and the network access point so that the power cord 208 can also carry network communications between the electric vehicle 200 and the receptacle 204. With such a bridge 120 and connection locality module 210 in place in a connection location, no other special wiring or physical medium is needed to communicate with the remote IPF module 134 of the electric vehicle 200 other than a conventional power cord 208 for providing residential line current at any conventional voltage. Upstream of the connection locality module 210, power and communication with the electric vehicle 200 are resolved into the powerline 206 and an Internet cable 104.

Alternatively, the power cord 208 may include safety features not found in conventional power and extension cords. For example, an electrical plug 212 of the power cord 208 may include electrical and/or mechanical safeguard components to prevent the remote IPF module 134 from electrifying or exposing the male conductors of the power cord 208 when the conductors are exposed to a human user.

In some embodiments, a radio frequency (RF) bridge (not shown) may assist the remote IPF module 134 in communicating with a foreign system, such as a utility smart meter (not shown) and/or a connection locality module 210. For example, the remote IPF module 134 may be equipped to communicate over power cord 208 or to engage in some form of RF communication, such as Zigbee or Bluetooth, and the foreign system may be able to engage in a different form of RF communication. In such an implementation, the RF bridge may be equipped to communicate with both the foreign system and remote IPF module 134 and to translate communications from one to a form the other may understand, and to relay those messages. In various embodiments, the RF bridge may be integrated into the remote IPF module 134 or foreign system, or may be external to both. The communicative associations between the RF bridge and remote IPF module 134 and between the RF bridge and foreign system may be via wired or wireless communication.

FIG. 2B shows a further view of electrical and communicative connections to an electric resource 112. In this example, the electric vehicle 200 may include a transceiver 212 rather than a remote IPF module 134. The transceiver 212 may be communicatively coupled to a charging component 214 through a connection 216, and the charging component itself may be coupled to a conventional wall receptacle (wall outlet) 204 of a residence 124 and to electric vehicle 200 through a power cord 208. The other components shown in FIG. 2B may have the couplings and functions discussed with regard to FIG. 2A.

In various embodiments, transceiver 212 and charging component 214 may, in combination, perform the same functions as the remote IPF module 134. Transceiver 212 may interface with computer systems of electric vehicle 200 and communicate with charging component 214, providing charging component 214 with information about electric vehicle 200, such as its vehicle identifier, a location identifier, and a state of charge. In response, transceiver 212 may receive requests and commands which transceiver 212 may relay to vehicle 200's computer systems.

Charging component 214, being coupled to both electric vehicle 200 and wall outlet 204, may effectuate charge control of the electric vehicle 200. If the electric vehicle 200 is not capable of charge control management, charging component 214 may directly manage the charging of electric vehicle 200 by stopping and starting a flow of power between the electric vehicle 200 and a power grid 114 in response to commands received from a flow control server 106. If, on the other hand, the electric vehicle 200 is capable of charge control management, charging component 214 may effectuate charge control by sending commands to the electric vehicle 200 through the transceiver 212.

In some embodiments, the transceiver 212 may be physically coupled to the electric vehicle 200 through a data port, such as an OBD-II connector. In other embodiments, other couplings may be used. The connection 216 between transceiver 212 and charging component 214 may be a wireless signal, such as a radio frequency (RF), such as a Zigbee or Bluetooth signal. And charging component 214 may include a receiver socket to couple with power cord 208 and a plug to couple with wall outlet 204. In one embodiment, charging component 214 may be coupled to connection locality module 210 in either a wired or wireless fashion. For example, charging component 214 might have a data interface for communicating wirelessly with both the transceiver 212 and locality module 210. In such an embodiment, the bridge 120 may not be required.

Figure 8A:
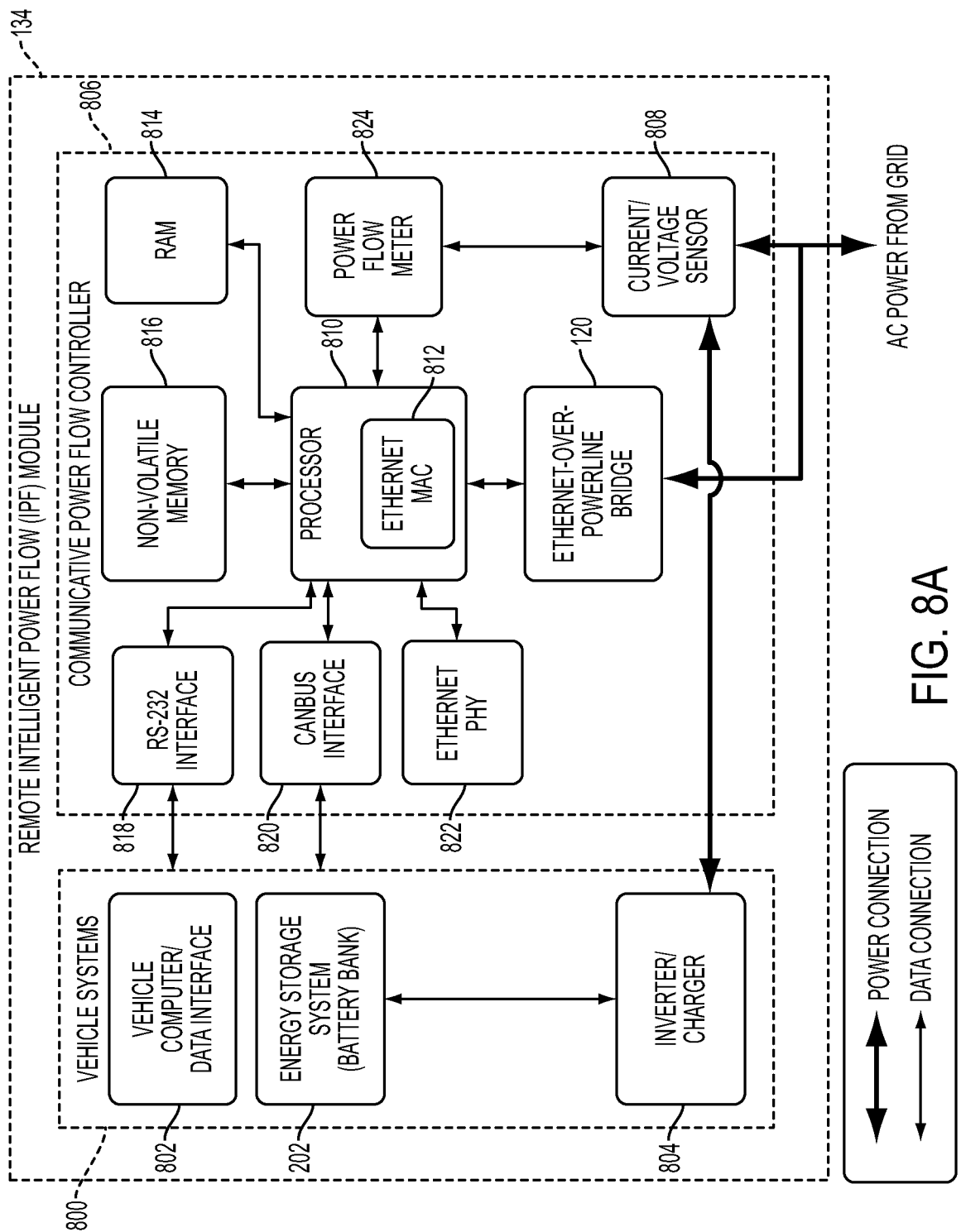
FIG. 8A is a block diagram of an example of remote intelligent power flow module.
Figure 8B:
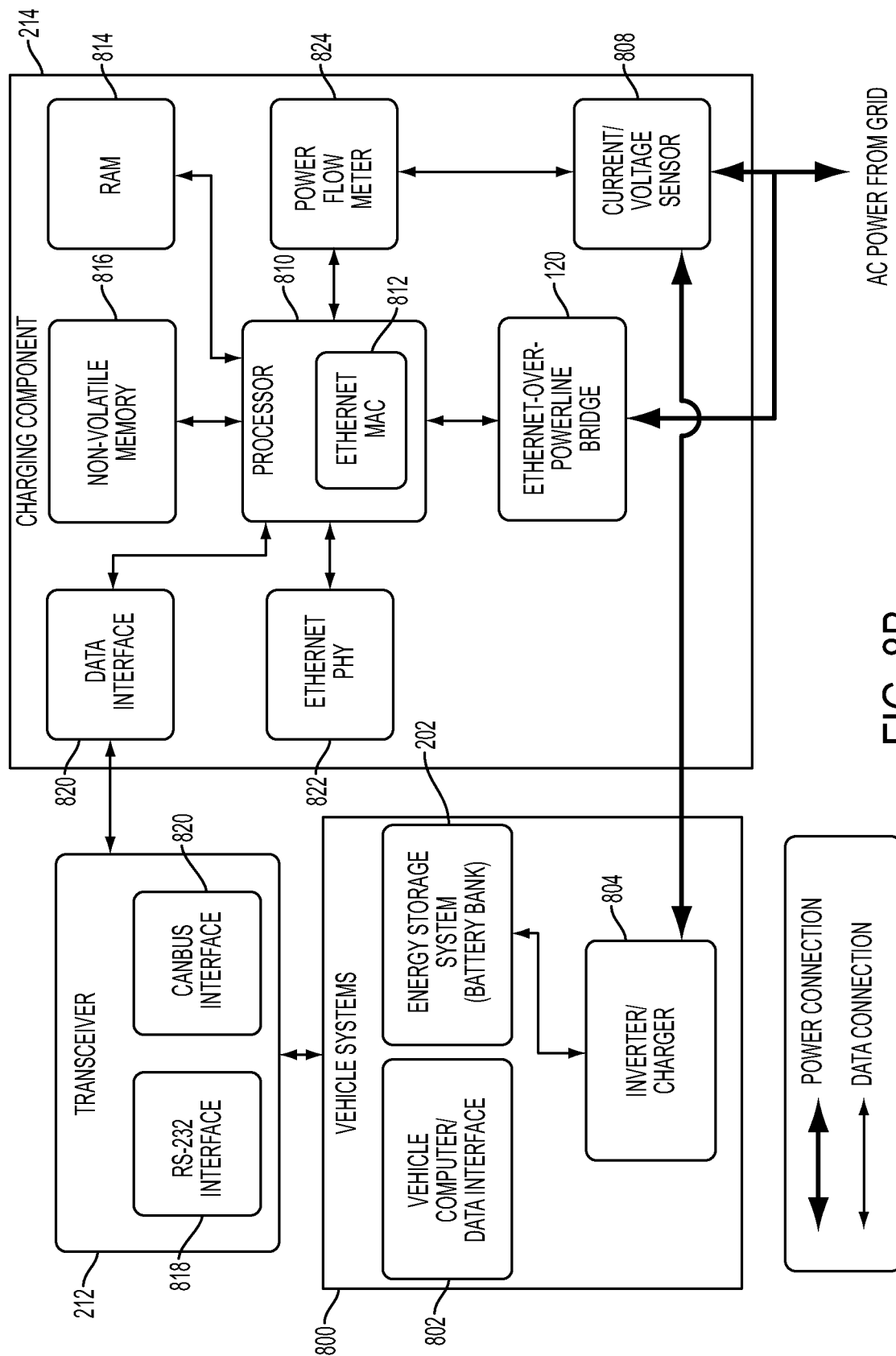
FIG. 8B is a block diagram of an example of transceiver and charging component combination.

Further details about the transceiver 212 and charging component 214 are illustrated by FIG. 8B and described in greater detail herein.

Figure 3:
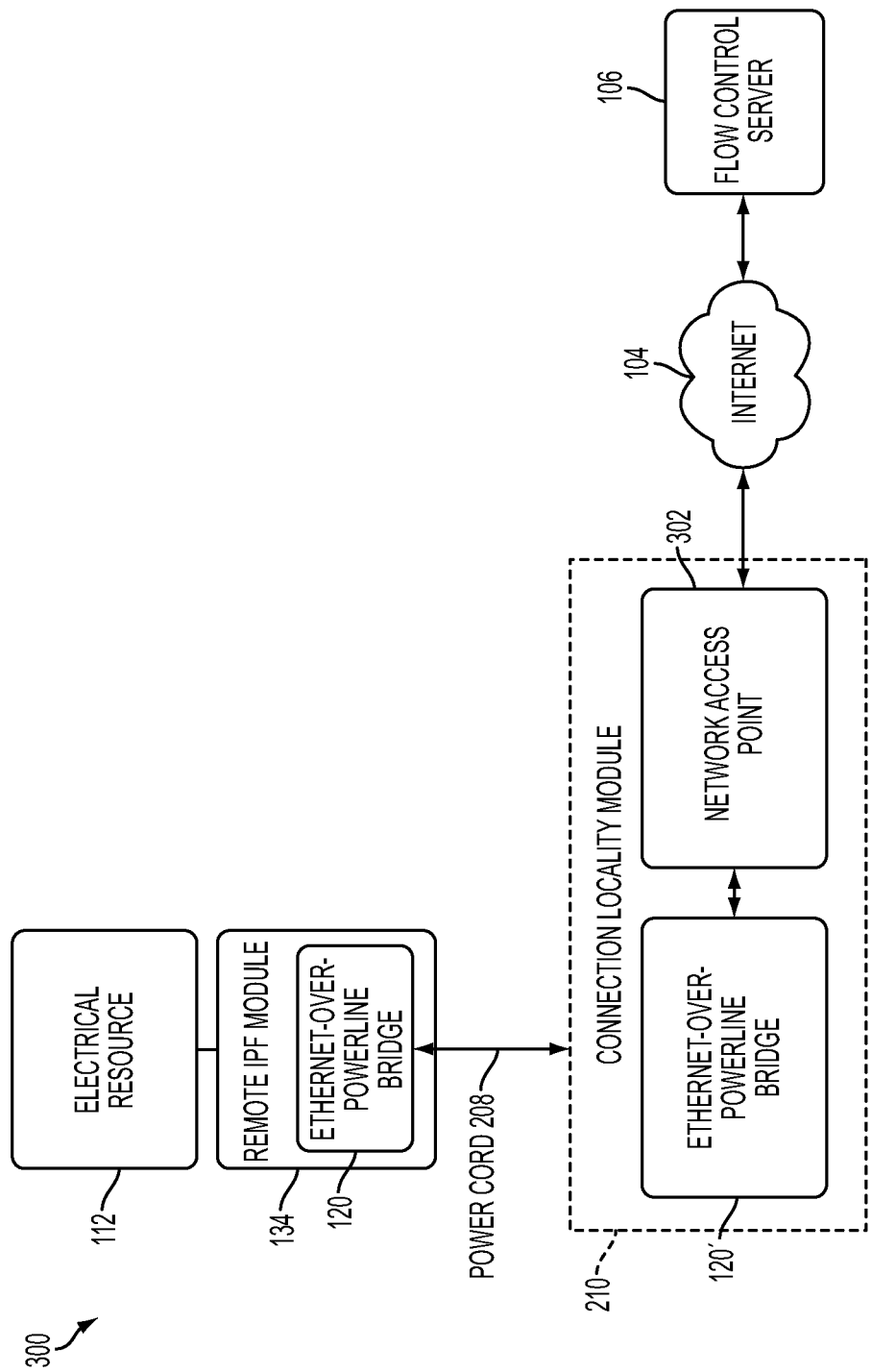
FIG. 3 is a block diagram of an example of connections between an electric resource and a flow control server of the power aggregation system.

FIG. 3 shows another implementation of the connection locality module 210 of FIG. 2, in greater detail. In FIG. 3, an electric resource 112 has an associated remote IPF module 134, including a bridge 120. The power cord 208 connects the electric resource 112 to the power grid 114 and also to the connection locality module 210 in order to communicate with the flow control server 106.

The connection locality module 210 includes another instance of a bridge 120, connected to a network access point 302, which may include such components as a router, switch, and/or modem, to establish a hardwired or wireless connection with, in this case, the Internet 104. In one implementation, the power cord 208 between the two bridges 120 and 120' is replaced by a wireless Internet link, such as a wireless transceiver in the remote IPF module 134 and a wireless router in the connection locality module 210.

In other embodiments, a transceiver 212 and charging component 214 may be used instead of a remote IPF module 134. In such an embodiment, the charging component 214 may include or be coupled to a bridge 120, and the connection locality module 210 may also include a bridge 120', as shown. In yet other embodiments, not shown, charging component 214 and connection locality module 210 may communicate in a wired or wireless fashion, as mentioned previously, without bridges 120 and 120'. The wired or wireless communication may utilize any sort of connection technology known in the art, such as Ethernet or RF communication, such as Zigbee, or Bluetooth.

System Layouts

Figure 4:
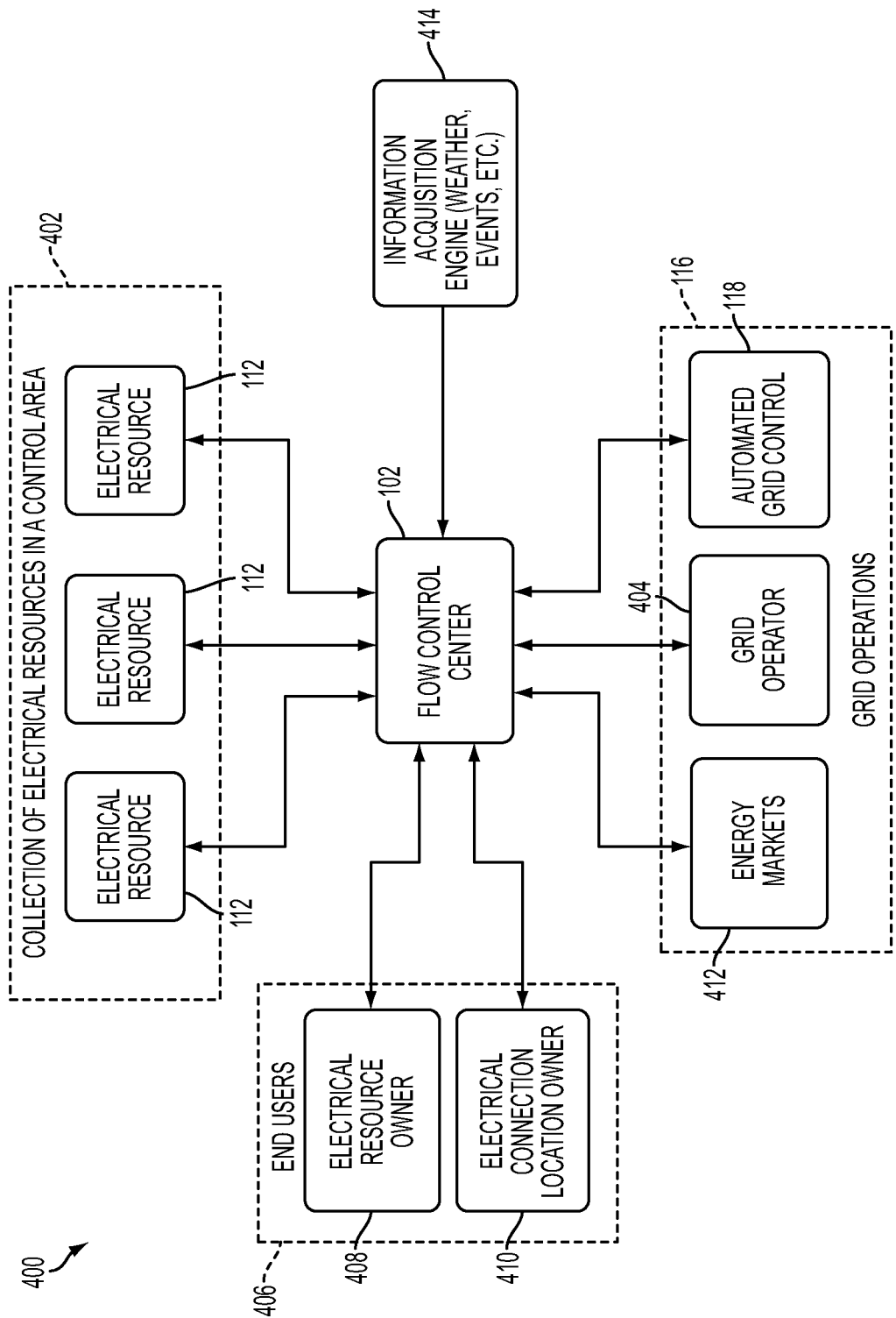
FIG. 4 is a diagram of an example of a layout of the power aggregation system.

FIG. 4 shows a layout 400 of the power aggregation system 100. The flow control center 102 can be connected to many different entities, e.g., via the Internet 104, for communicating and receiving information. The layout 400 includes electric resources 112, such as plug-in electric vehicles 200, physically connected to the grid within a single control area 402. The electric resources 112 become an energy resource for grid operators 404 to utilize.

The layout 400 also includes end users 406 classified into electric resource owners 408 and electrical connection location owners 410, who may or may not be one and the same. In fact, the stakeholders in a power aggregation system 100 include the system operator at the flow control center 102, the grid operator 404, the resource owner 408, and the owner of the location 410 at which the electric resource 112 is connected to the power grid 114.

Electrical connection location owners 410 can include:

Rental car lots—rental car companies often have a large portion of their fleet parked in the lot. They can purchase fleets of electric vehicles 200 and, participating in a power aggregation system 100, generate revenue from idle fleet vehicles.

Public parking lots—parking lot owners can participate in the power aggregation system 100 to generate revenue from parked electric vehicles 200. Vehicle owners can be offered free parking, or additional incentives, in exchange for providing power services.

Workplace parking—employers can participate in a power aggregation system 100 to generate revenue from parked employee electric vehicles 200. Employees can be offered incentives in exchange for providing power services.

Residences—a home garage can merely be equipped with a connection locality module 210 to enable the homeowner to participate in the power aggregation system 100 and generate revenue from a parked car. Also, the vehicle battery 202 and associated power electronics within the vehicle can provide local power backup power during times of peak load or power outages.

Residential neighborhoods—neighborhoods can participate in a power aggregation system 100 and be equipped with power-delivery devices (deployed, for example, by homeowner cooperative groups) that generate revenue from parked electric vehicles 200.

The grid operations 116 of FIG. 4 collectively include interactions with energy markets 412, the interactions of grid operators 404, and the interactions of automated grid controllers 118 that perform automatic physical control of the power grid 114.

The flow control center 102 may also be coupled with information sources 414 for input of weather reports, events, price feeds, etc. Other data sources 414 include the system stakeholders, public databases, and historical system data, which may be used to optimize system performance and to satisfy constraints on the power aggregation system 100.

Thus, a power aggregation system 100 may consist of components that:

communicate with the electric resources 112 to gather data and actuate charging/discharging of the electric resources 112;

gather real-time energy prices;

gather real-time resource statistics;

predict behavior of electric resources 112 (connectedness, location, state (such as battery State-Of-Charge) at a given time of interest, such as a time of connect/disconnect);

predict behavior of the power grid 114/load;

encrypt communications for privacy and data security;

actuate charging of electric vehicles 200 to optimize some figure(s) of merit;

offer guidelines or guarantees about load availability for various points in the future, etc.

These components can be running on a single computing resource (computer, etc.), or on a distributed set of resources (either physically co-located or not).

Power aggregation systems 100 in such a layout 400 can provide many benefits: for example, lower-cost ancillary services (i.e., power services), fine-grained (both temporal and spatial) control over resource scheduling, guaranteed reliability and service levels, increased service levels via intelligent resource scheduling, and/or firming of intermittent generation sources such as wind and solar power generation.

The power aggregation system 100 enables a grid operator 404 to control the aggregated electric resources 112 connected to the power grid 114. An electric resource 112 can act as a power source, load, or storage, and the resource 112 may exhibit combinations of these properties. Control of a set of electric resources 112 is the ability to actuate power consumption, generation, or energy storage from an aggregate of these electric resources 112.

Figure 5:
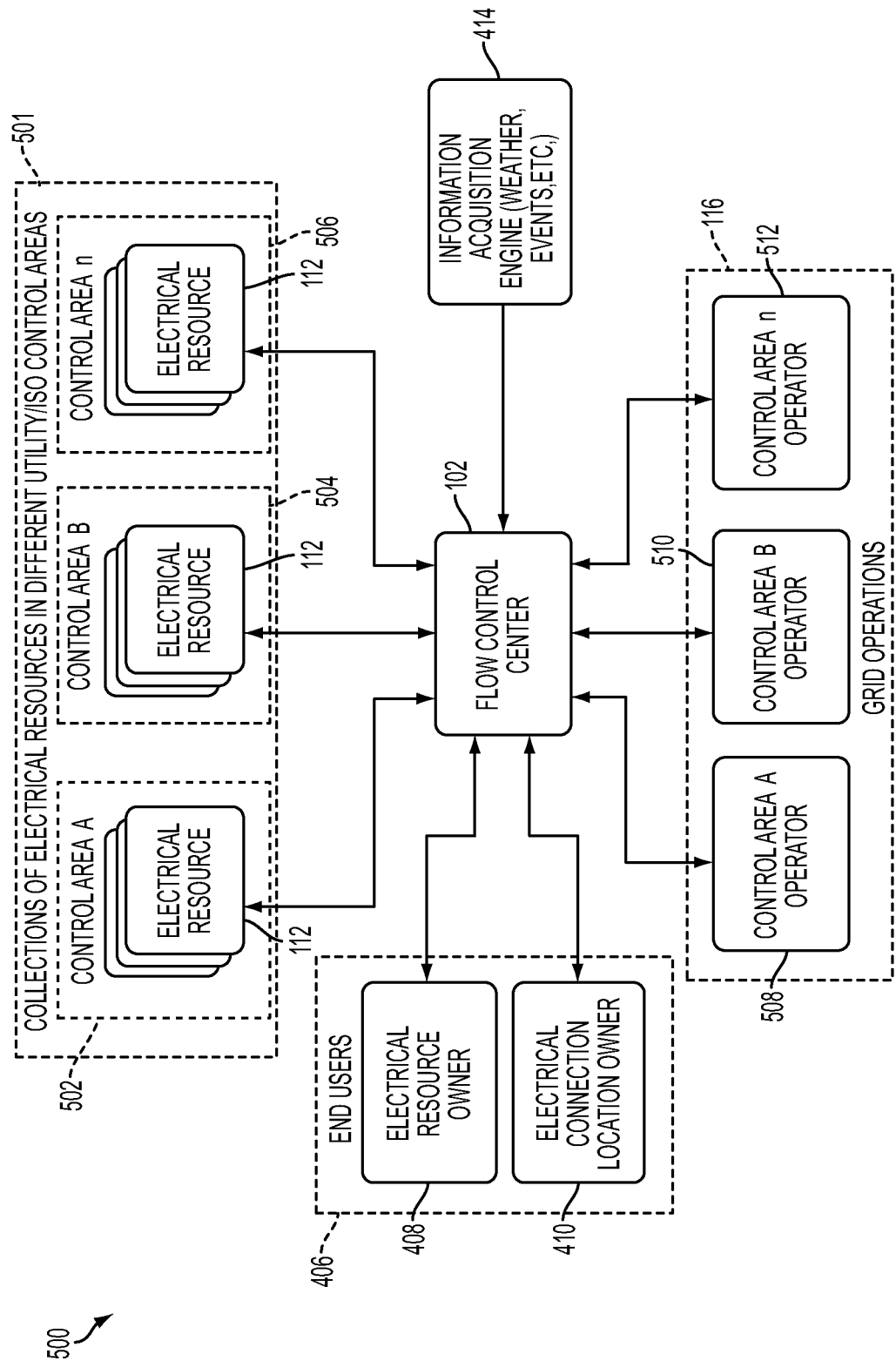
FIG. 5 is a diagram of an example of control areas in the power aggregation system.

FIG. 5 shows the role of multiple control areas 402 in the power aggregation system 100. Each electric resource 112 can be connected to the power aggregation system 100 within a specific electrical control area. A single instance of the flow control center 102 can administer electric resources 112 from multiple distinct control areas 501 (e.g., control areas 502, 504, and 506). In one implementation, this functionality is achieved by logically partitioning resources within the power aggregation system 100. For example, when the control areas 402 include an arbitrary number of control areas, control area "A" 502, control area "B" 504, . . . , control area "n" 506, then grid operations 116 can include corresponding control area operators 508, 510, . . . , and 512. Further division into a control hierarchy that includes control division groupings above and below the illustrated control areas 402 allows the power aggregation system 100 to scale to power grids 114 of different magnitudes and/or to varying numbers of electric resources 112 connected with a power grid 114.

Figure 6:
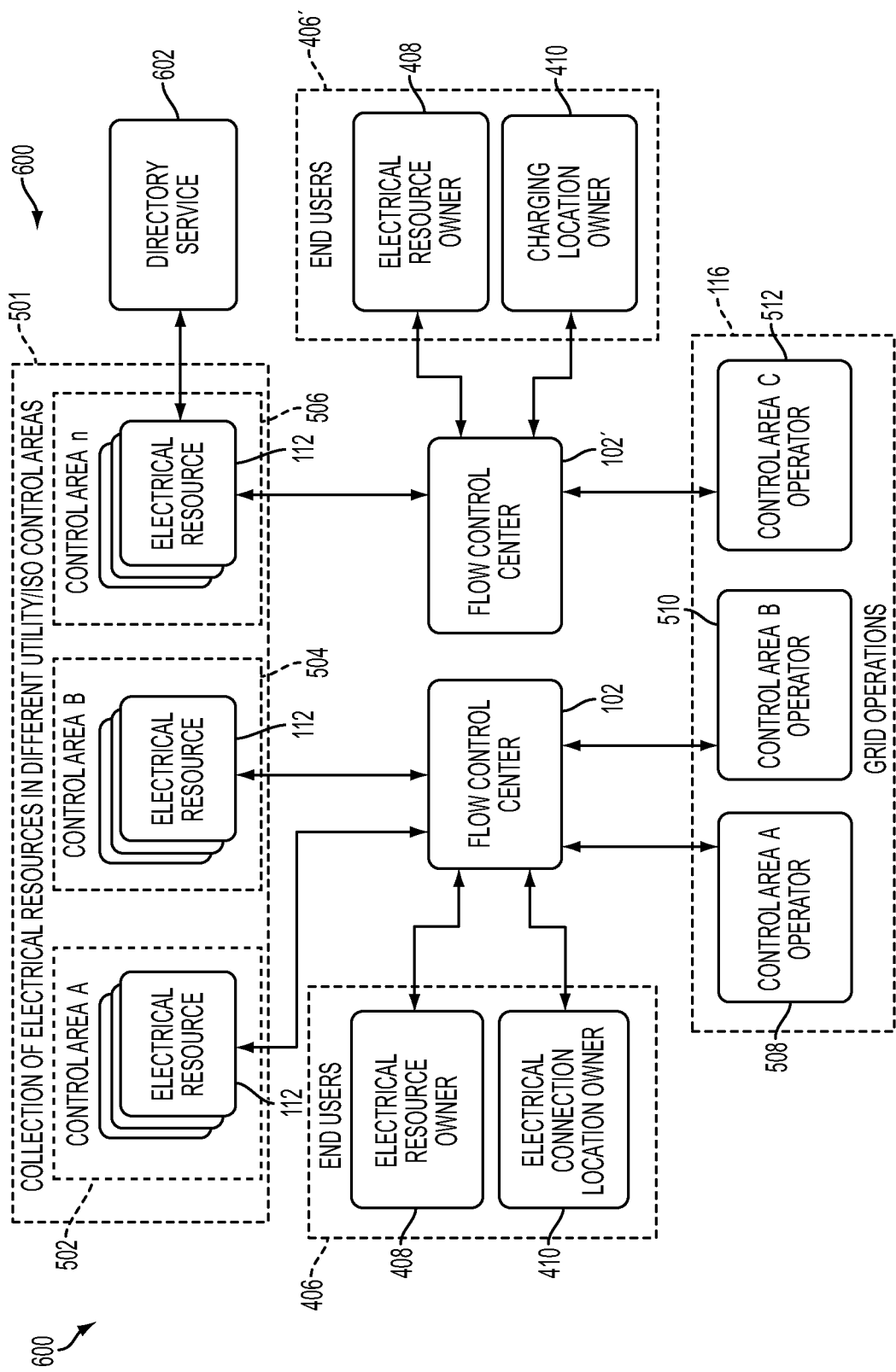
FIG. 6 is a diagram of multiple flow control centers in the power aggregation system and a directory server for determining a flow control center.

FIG. 6 shows a layout 600 of a power aggregation system 100 that uses multiple centralized flow control centers 102 and 102' and a directory server 602 for determining a flow control center. Each flow control center 102 and 102' has its own respective end users 406 and 406'. Control areas 402 to be administered by each specific instance of a flow control center 102 can be assigned dynamically. For example, a first flow control center 102 may administer control area A 502 and control area B 504, while a second flow control center 102' administers control area n 506. Likewise, corresponding control area operators (508, 510, and 512) are served by the same flow control center 102 that serves their respective different control areas.

In various embodiments, an electric resource may determine which flow control center 102/102' administers its control area 502/504/506 by communicating with a directory server 602. The address of the directory server 602 may be known to electric resource 112 or its associated IPF module 134 or charging component 214. Upon plugging in, the electric resource 112 may communicate with the directory server 602, providing the directory server 112 with a resource identifier and/or a location identifier. Based on this information, the directory server 602 may respond, identifying which flow control center 102/102' to use.

In another embodiment, directory server 602 may be integrated with a flow control server 106 of a flow control center 102/102'. In such an embodiment, the electric resource 112 may contact the server 106. In response, the server 106 may either interact with the electric resource 112 itself or forward the connection to another flow control center 102/102' responsible for the location identifier provided by the electric resource 112.

In some embodiments, whether integrated with a flow control server 106 or not, directory server 602 may include a publicly accessible database for mapping locations to flow control centers 102/102'.

Flow Control Server

FIG. 7 shows a server 106 of the flow control center 102. The illustrated implementation in FIG. 7 is only one example configuration, for descriptive purposes. Many other arrangements of the illustrated components or even different components constituting a server 106 of the flow control center 102 are possible within the scope of the subject matter. Such a server 106 and flow control center 102 can be executed in hardware, software, or combinations of hardware, software, firmware, etc.

The flow control server 106 includes a connection manager 702 to communicate with electric resources 112, a prediction engine 704 that may include a learning engine 706 and a statistics engine 708, a constraint optimizer 710, and a grid interaction manager 712 to receive grid control signals 714. Grid control signals 714 are sometimes referred to as generation control signals, such as automated generation control (AGC) signals. The flow control server 106 may further include a database/information warehouse 716, a web server 718 to present a user interface to electric resource owners 408, grid operators 404, and electrical connection location owners 410; a contract manager 720 to negotiate contract terms with energy markets 412, and an information acquisition engine 414 to track weather, relevant news events, etc., and download information from public and private databases 722 for predicting behavior of large groups of the electric resources 112, monitoring energy prices, negotiating contracts, etc.

Remote IPF Module

FIG. 8A shows the remote IPF module 134 of FIGS. 1 and 2 in greater detail. The illustrated remote IPF module 134 is only one example configuration, for descriptive purposes. Many other arrangements of the illustrated components or even different components constituting a remote IPF module 134 are possible within the scope of the subject matter. Such a remote IPF module 134 has some hardware components and some components that can be executed in hardware, software, or combinations of hardware, software, firmware, etc. In other embodiments, executable instructions configured to perform some or all of the operations of remote IPF module 134 may be added to hardware of an electric resource 112 such as an electric vehicle that, when combined with the executable instructions, provides equivalent functionality to remote IPF module 134. References to remote IPF module 134 as used herein include such executable instructions.

The illustrated example of a remote IPF module 134 is represented by an implementation suited for an electric vehicle 200. Thus, some vehicle systems 800 are included as part of the remote IPF module 134 for the sake of description. However, in other implementations, the remote IPF module 134 may exclude some or all of the vehicles systems 800 from being counted as components of the remote IPF module 134.

The depicted vehicle systems 800 include a vehicle computer and data interface 802, an energy storage system, such as a battery bank 202, and an inverter/charger 804. Besides vehicle systems 800, the remote IPF module 134 also includes a communicative power flow controller 806. The communicative power flow controller 806 in turn includes some components that interface with AC power from the grid 114, such as a powerline communicator, for example an Ethernet-over-powerline bridge 120, and a current or current/voltage (power) sensor 808, such as a current sensing transformer.

The communicative power flow controller 806 also includes Ethernet and information processing components, such as a processor 810 or microcontroller and an associated Ethernet media access control (MAC) address 812; volatile random access memory 814, nonvolatile memory 816 or data storage, an interface such as an RS-232 interface 818 or a CANbus interface 820; an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The communicative power flow controller 806 also includes a bidirectional power flow meter 824 that tracks power transfer to and from each electric resource 112, in this case the battery bank 202 of an electric vehicle 200.

The communicative power flow controller 806 operates either within, or connected to an electric vehicle 200 or other electric resource 112 to enable the aggregation of electric resources 112 introduced above (e.g., via a wired or wireless communication interface). These above-listed components may vary among different implementations of the communicative power flow controller 806, but implementations typically include:

an intra-vehicle communications mechanism that enables communication with other vehicle components;
a mechanism to communicate with the flow control center 102;
a processing element;
a data storage element;
a power meter; and
optionally, a user interface.

Implementations of the communicative power flow controller 806 can enable functionality including:

executing pre-programmed or learned behaviors when the electric resource 112 is offline (not connected to Internet 104, or service is unavailable);
storing locally-cached behavior profiles for "roaming" connectivity (what to do when charging on a foreign system, i.e., when charging in the same utility territory on a foreign meter or in a separate utility territory, or in disconnected operation, i.e., when there is no network connectivity);
allowing the user to override current system behavior; and
metering power-flow information and caching meter data during offline operation for later transaction.

Thus, the communicative power flow controller 806 includes a central processor 810, interfaces 818 and 820 for communication within the electric vehicle 200, a powerline communicator, such as an Ethernet-over-powerline bridge 120 for communication external to the electric vehicle 200, and a power flow meter 824 for measuring energy flow to and from the electric vehicle 200 via a connected AC powerline 208.

Power Flow Meter

Power is the rate of energy consumption per interval of time. Power indicates the quantity of energy transferred during a certain period of time, thus the units of power are quantities of energy per unit of time. The power flow meter 824 measures power for a given electric resource 112 across a bidirectional flow—e.g., power from grid 114 to electric vehicle 200 or from electric vehicle 200 to the grid 114. In one implementation, the remote IPF module 134 can locally cache readings from the power flow meter 824 to ensure accurate transactions with the central flow control server 106, even if the connection to the server is down temporarily, or if the server itself is unavailable.

Transceiver and Charging Component

FIG. 8B shows the transceiver 212 and charging component 214 of FIG. 2B in greater detail. The illustrated transceiver 212 and charging component 214 is only one example configuration, for descriptive purposes. Many other arrangements of the illustrated components or even different components constituting the transceiver 212 and charging component 214 are possible within the scope of the subject matter. Such a transceiver 212 and charging component 214 have some hardware components and some components that can be executed in hardware, software, or combinations of hardware, software, firmware, etc.

The illustrated example of the transceiver 212 and charging component 214 is represented by an implementation suited for an electric vehicle 200. Thus, some vehicle systems 800 are illustrated to provide context to the transceiver 212 and charging component 214 components.

The depicted vehicle systems 800 include a vehicle computer and data interface 802, an energy storage system, such as a battery bank 202, and an inverter/charger 804. In some embodiments, vehicle systems 800 may include a data port, such as an OBD-II port, that is capable of physically coupling with the transceiver 212. The transceiver 212 may then communicate with the vehicle computer and data interface 802 through the data port, receiving information from electric resource 112 comprised by vehicle systems 800 and, in some embodiments, providing commands to the vehicle computer and data interface 802. In one implementation, the vehicle computer and data interface 802 may be capable of charge control management. In such an embodiment, the vehicle computer and data interface 802 may perform some or all of the charging component 214 operations discussed below. In other embodiments, executable instructions configured to perform some or all of the operations of the vehicle computer and data interface 802 may be added to hardware of an electric resource 112 such as an electric vehicle that, when combined with the executable instructions, provides equivalent functionality to the vehicle computer and data interface 802. References to the vehicle computer and data interface 802 as used herein include such executable instructions.

In various embodiments, the transceiver 212 may have a physical form that is capable of coupling to a data port of vehicle systems 800. Such a transceiver 212 may also include a plurality of interfaces, such as an RS-232 interface 818 and/or a CANBus interface 820. In various embodiments, the RS-232 interface 818 or CANBus interface 820 may enable the transceiver 212 to communicate with the vehicle computer and data interface 802 through the data port. Also, the transceiver may be or comprise an additional interface (not shown) capable of engaging in wireless communication with a data interface 820 of the charging component 214. The wireless communication may be of any form known in the art, such as radio frequency (RF) communication (e.g., Zigbee and/or Bluetooth communication). In other embodiments, the transceiver may comprise a separate conductor or may be configured to utilize a powerline 208 to communicate with charging component 214. In yet other embodiments, not shown, transceiver 212 may simply be a radio frequency identification (RFID) tag capable of storing minimal information about the electric resource 112, such as a resource identifier, and of being read by a corresponding RFID reader of charging component 214. In such other embodiments, the RFID tag might not couple with a data port or communicate with the vehicle computer and data interface 802.

As shown, the charging component 214 may be an intelligent plug device that is physically connected to a charging medium, such as a powerline 208 (the charging medium coupling the charging component 214 to the electric resource 112) and an outlet of a power grid (such as the wall outlet 204 shown in FIG. 2B). In other embodiments charging component 214 may be a charging station or some other external control. In some embodiments, the charging component 214 may be portable.

In various embodiments, the charging component 214 may include components that interface with AC power from the grid 114, such as a powerline communicator, for example an Ethernet-over-powerline bridge 120, and a current or current/voltage (power) sensor 808, such as a current sensing transformer.

In other embodiments, the charging component 214 may include a further Ethernet plug or wireless interface in place of bridge 120. In such an embodiment, data-over-powerline communication is not necessary, eliminating the need for a bridge 120. The Ethernet plug or wireless interface may communicate with a local access point, and through that access point to flow control server 106.

The charging component 214 may also include Ethernet and information processing components, such as a processor 810 or microcontroller and an associated Ethernet media access control (MAC) address 812; volatile random access memory 814, nonvolatile memory 816 or data storage, a data interface 826 for communicating with the transceiver 212, and an Ethernet physical layer interface 822, which enables wiring and signaling according to Ethernet standards for the physical layer through means of network access at the MAC/Data Link Layer and a common addressing format. The Ethernet physical layer interface 822 provides electrical, mechanical, and procedural interface to the transmission medium—i.e., in one implementation, using the Ethernet-over-powerline bridge 120. In a variation, wireless or other communication channels with the Internet 104 are used in place of the Ethernet-over-powerline bridge 120.

The charging component 214 may also include a bidirectional power flow meter 824 that tracks power transfer to and from each electric resource 112, in this case the battery bank 202 of an electric vehicle 200.

Further, in some embodiments, the charging component 214 may comprise an RFID reader to read the electric resource information from transceiver 212 when transceiver 212 is an RFID tag.

Also, in various embodiments, the charging component 214 may include a credit card reader to enable a user to identify the electric resource 112 by providing credit card information. In such an embodiment, a transceiver 212 may not be necessary.

Additionally, in one embodiment, the charging component 214 may include a user interface, such as one of the user interfaces described in greater detail below.

Implementations of the charging component 214 can enable functionality including:

executing pre-programmed or learned behaviors when the electric resource 112 is offline (not connected to Internet 104, or service is unavailable);

storing locally-cached behavior profiles for "roaming" connectivity (what to do when charging on a foreign system or in disconnected operation, i.e., when there is no network connectivity);

allowing the user to override current system behavior; and metering power-flow information and caching meter data during offline operation for later transaction.

User Interfaces (UI)

Charging Station UI. An electrical charging station, whether free or for pay, can be installed with a user interface that presents useful information to the user. Specifically, by collecting information about the grid 114, the electric resource state, and the preferences of the user, the station can present information such as the current electricity price, the estimated recharge cost, the estimated time until recharge, the estimated payment for uploading power to the grid 114 (either total or per hour), etc. The information acquisition engine 414 communicates with the electric resource 112 and with public and/or private data networks 722 to acquire the data used in calculating this information.

The types of information gathered from the electric resource 112 could include an electric resource identifier (resource ID) and state information like the state of charge of the electric resource 112. The resource ID could be used to obtain knowledge of the electric resource type and capabilities, preferences, etc. through lookup with the flow control server 106.

In various embodiments, the charging station system including the UI might also gather grid-based information, such as current and future energy costs at the charging station.

User Charge Control UI Mechanisms. In various embodiments, by default, electric resources 112 may receive charge control management via power aggregation system 100. In some embodiments, an override control may be provided to override charge control management and charge as soon as possible. The override control may be provided, in various embodiments, as a user interface mechanism of the remote IPF module 134, the charging component 214, of the electric resource (for example, if electric resource is a vehicle 200, the user interface control may be integrated with dash controls of the vehicle 200) or even via a web page offered by flow control server 106. The control could be presented, for example, as a button, a touch screen option, a web page, or some other UI mechanism. In one embodiment, the UI may be the UI illustrated by FIG. 8C and discussed in greater detail below. In some embodiments, the override would be a one-time override, only applying to a single plug-in session. Upon disconnecting and reconnecting, the user may again need to interact with the UI mechanism to override the charge control management.

In some embodiments, the user may pay more to charge with the override on than under charge control management, thus providing an incentive for the user to accept charge control management. Such a cost differential may be displayed or rendered to the user in conjunction with or on the UI mechanism. This differential could take into account time-varying pricing, such as Time of Use (TOU), Critical Peak Pricing (CPP), and Real-Time Pricing (RTP) schemes, as discussed above, as well as any other incentives, discounts, or payments that might be forgone by not accepting charge control management.

UI Mechanism for Management Preferences. In various embodiments, a user interface mechanism of the remote IPF module 134, the charging component 214, of the electric resource (for example, if electric resource is a vehicle 200, the user interface control may be integrated with dash controls of the vehicle 200) or even via a web page offered by flow control server 106 may enable a user to enter and/or edit management preferences to affect charge control management of the user's electric resource 112. In some embodiments, the UI mechanism may allow the user to enter/edit general preferences, such as whether charge control management is enabled, whether vehicle-to-grid power flow is enabled or whether the electric resource 112 should only be charged with clean/green power. Also, in various embodiments, the UI mechanism may enable a user to prioritize relative desires for minimizing costs, maximizing payments (i.e., fewer charge periods for higher amounts), achieving a full state-of-charge for the electric resource 112, charging as rapidly as possible, and/or charging in as environmentally-friendly a way as possible. Additionally, the UI mechanism may enable a user to provide a default schedule for when the electric resource will be used (for example, if resource 112 is a vehicle 200, the schedule would be for when the vehicle 200 should be ready to drive). Further, the UI mechanism may enable the user to add or select special rules, such as a rule not to charge if a price threshold is exceeded or a rule to only use charge control management if it will earn the user at least a specified threshold of output. Charge control management may then be effectuated based on any part or all of these user entered preferences.

Figure 8C:
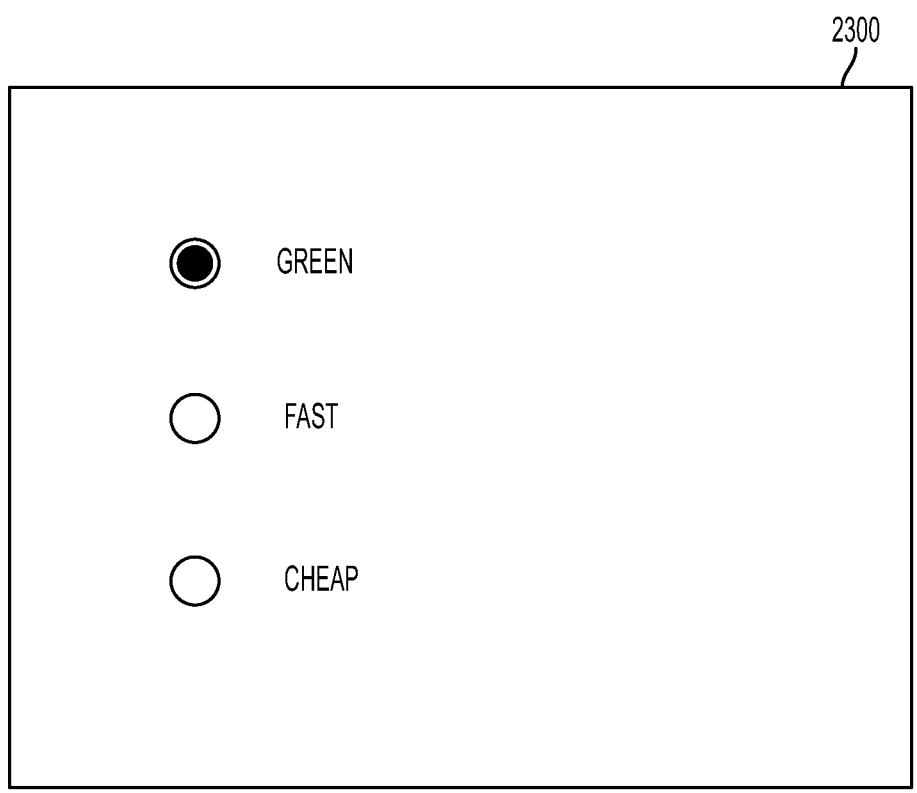
FIG. 8C is an illustration of an example of simple user interface for facilitating user controlled charging.

Simple User Interface. FIG. 8C illustrates a simple user interface (UI) which enables a user to control charging based on selecting among a limited number of high level preferences. For example, UI 2300 includes the categories "green", "fast", and "cheap" (with what is considered "green", "fast", and "cheap" varying from embodiment to embodiment). The categories shown in UI 2300 are selected only for the sake of illustration and may instead includes these and/or any other categories applicable to electric resource 112 charging known in the art. As shown, the UI 2300 may be very basic, using well known form controls such as radio buttons. In other embodiments, other graphic controls known in the art may be used. The general categories may be mapped to specific charging behaviors, such as those discussed above, by a flow control server 106.

Electric Resource Communication Protocol

Figure 9:
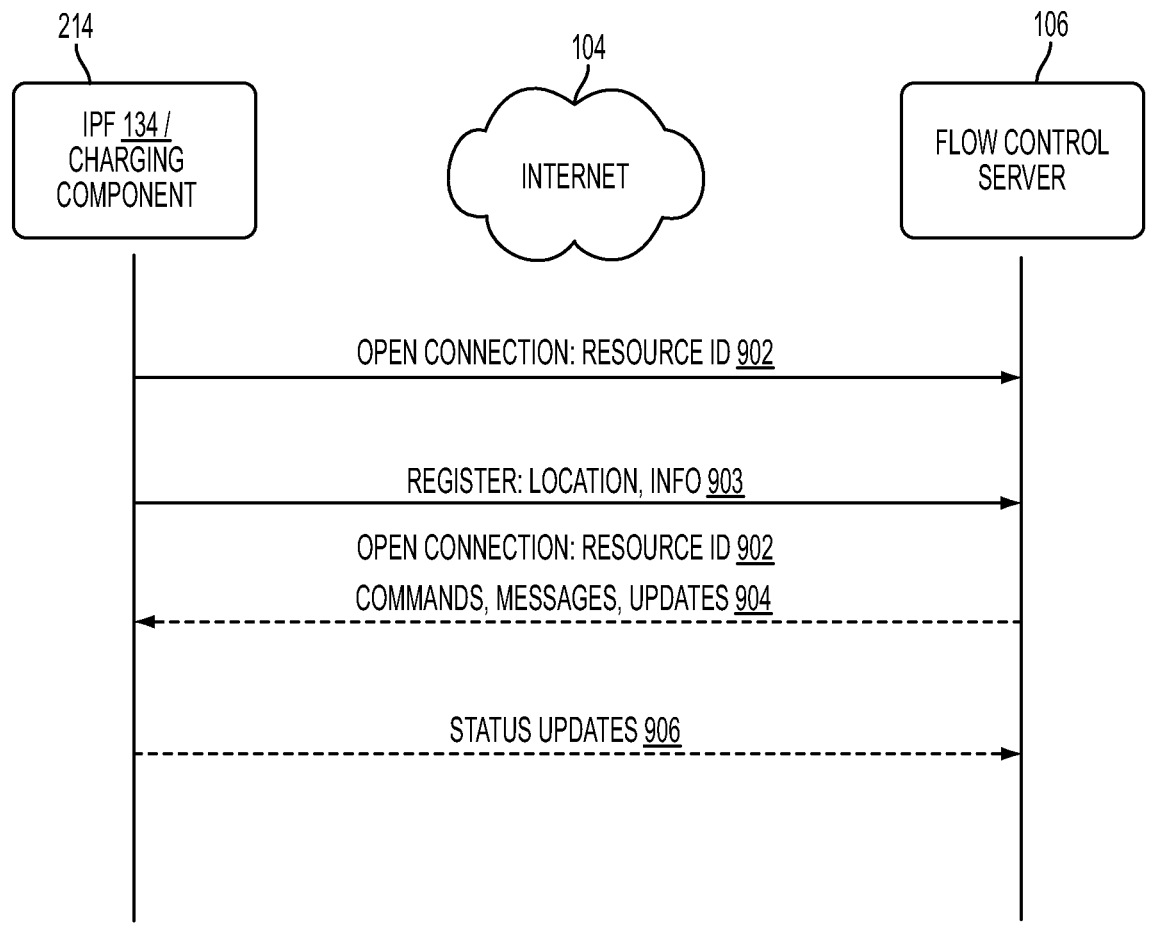
FIG. 9 is a diagram of an example of resource communication protocol.

FIG. 9 illustrates a resource communication protocol. As shown, a remote IPF module 134 or charging component 214 may be in communication with a flow control server 106 over the Internet 104 or another networking fabric or combination of networking fabrics. In various embodiments, a protocol specifying an order of messages and/or a format for messages may be used to govern the communications between the remote IPF module 134 or charging component 214 and flow control server 106.

In some embodiments, the protocol may include two channels, one for messages initiated by the remote IPF module 134 or charging component 214 and for replies to those messages from the flow control server 106, and another channel for messages initiated by the flow control server 106 and for replies to those messages from the remote IPF module 134 or charging component 214. The channels may be asynchronous with respect to each other (that is, initiation of messages on one channel may be entirely independent of initiation of messages on the other channel). However, each channel may itself be synchronous (that is, once a message is sent on a channel, another message may not be sent until a reply to the first message is received).

As shown, the remote IPF module 134 or charging component 214 may initiate communication 902 with the flow control server 106. In some embodiments, communication 902 may be initiated when, for example, an electric resource 112 first plugs in/connects to the power grid 114. In other embodiments, communication 902 may be initiated at another time or times. The initial message 902 governed by the protocol may require, for example, one or more of an electric resource identifier, such as a MAC address, a protocol version used, and/or a resource identifier type.

Upon receipt of the initial message by the flow control server 106, a connection may be established between the remote IPF module 134 or charging component 214 and flow control server 106. Upon establishing a connection, the remote IPF module 134 or charging component 214 may register with flow control server 106 through a subsequent communication 903. Communication 903 may include a location identifier scheme, a latitude, a longitude, a max power value that the remote IPF module 134 or charging component 214 can draw, a max power value that the remote IPF module 134 or charging component 214 can provide, a current power value, and/or a current state of charge.

After the initial message 902, the protocol may require or allow messages 904 from the flow control server 106 to the remote IPF module 134 or charging component 214 or messages 906 from remote IPF module 134 or charging component 214 to the flow control server 106. The messages 904 may include, for example, one or more of commands, messages, and/or updates. Such messages 904 may be provided at any time after the initial message 902. In one embodiment, messages 904 may include a command setting, a power level and/or a ping to determine whether the remote IPF module 134 or charging component 214 is still connected.

The messages 906 may include, for example, status updates to the information provided in the registration message 903. Such messages 906 may be provided at any time after the initial message 902. In one embodiment, the messages 906 may be provided on a predetermined time interval basis. In various embodiments, messages 906 may even be sent when the remote IPF module 134 or charging component 214 is connected, but not registered. Such messages 906 may include data that is stored by flow control server 106 for later processing. Also, in some embodiments, messages 904 may be provided in response to a message 902 or 906.

Smart Charging Customer Guarantees for Electric Vehicles

In many applications, it is beneficial for an entity, such as a utility company, to moderate the rate of power flow into an electric vehicle or similar device. Because an electric vehicle is typically plugged in for more hours than is required to fully charge the electric vehicle, a flexible charge pattern is consistent with fully charging the battery. In many business environments, it is necessary to obtain the consent of the vehicle owner or operator in order to impose such a power flow management program.

A key component of obtaining such consent is to provide a smart charging behavior guarantee to the owner of an electric resource. A well structured guarantee will avoid inconveniencing the vehicle owner, but will still provide substantial flexibility with regard to power flow into, and/or out of, the vehicle.

An example of such a smart charging behavior guarantee includes having an electric vehicle charge to a predetermined level within a set number of hours of plugging the electric vehicle into an electrical outlet. The guarantee may be an agreement to charge the electric vehicle to level X (e.g. fully charged) within N (e.g. 10.5) hours of having been connected to a power grid.

In another embodiment of the smart charging behavior guarantee, an electric vehicle is charged to level X by time Y, where time Y can be set by the user (e.g. every morning at 7 a.m.). The time Y may be inferred by the system based on predictions from past individual and/or aggregate behavior.

In yet another embodiment, the smart charging behavior guarantee prohibits more than N hours of total non-charging time (i.e. total delay) before reaching level X during a charge session. For example, the guarantee can set a maximum of 3 hours of total non-charging time before the battery reaches the target level.

The smart charging behavior guarantee, in one embodiment, prohibits more than N hours of total non-charging time (i.e. total delay) before reaching level X during given time window. This may be across multiple charge sessions. For example, the guarantee can set a maximum of 3 hours of total non-charging time spread over all charging sessions occurring during a 24 hour period.

In another embodiment, the guarantee prohibits more than N hours of total non-charging time (i.e. total delay) before reaching level X and/or no more than M non-charging events during given long time window. Once again, this may be across multiple charge sessions, such as setting a maximum of 50 hours of total non-charging time, and/or 10 curtailment events, spread over a whole year.

In one embodiment, in each time period (e.g. 1 hour) during charging, at least N % of the time is set to be spent charging (e.g. at least 50% of each hour). The time spent charging may be static from hour to hour. The actual charging time may be set to follow a curve over a time period, where the N % changes over the time periods (e.g. 20% the first hour, 30% the second hour, etc.).

For established smart charging behavior guarantees, a charge optimization engine incorporates each customers' specific guarantee into a system-wide charging plan. This allows the system overall to achieve aggregate goals, which may include but are not limited to load shifting, demand response, load leveling, wind (or other renewable) smoothing or firming, providing spinning/non-spinning reserves, providing system regulation, or other energy or ancillary services.

The guarantee may potentially be structured to provide financial or other remediation to the vehicle owner if the terms are not met. For example, in such a case the owner could be given a payment (e.g. $20), or given free charging for a period of time (e.g. 1 week), or other similar forms of compensation.

In an embodiment, a time by which the vehicle charging must be completed includes calculating, when a vehicle plugs in, the charging time needed to charge the vehicle to the goal level of state of charge. In a linear charging time model, the delayable time is: Max(((target_SOC−current_SOC)/100)*energy_capacity/charging_rate, 0). Given variable (A) for the charge time, and variable (B) for the amount of time available until the deadline time, the model Max(B−A, 0) calculates the amount of delayable time available for the purposes of smart charging. For example, if it will take 6 hours to charge to the desired level, and 10 hours are available, we have 4 hours of delayable time. More complex charging time models, such as non-linear models, could be utilized instead of the simple linear model. In a vehicle-to-grid embodiment, the delayable time may shrink based on the amount of energy transferred out of the vehicle.

In an embodiment, the available delay for a given vehicle may be used as input to a cost function that is used to select which vehicles to delay. The more delay available for a given vehicle, the more eligible it is for selection to be delayed, and vice versa. If no delay is available, the cost of selecting this vehicle for delay is infinite, and cannot be selected, or potentially based on the magnitude of the penalty for not meeting the guarantee.

Figure 10A:
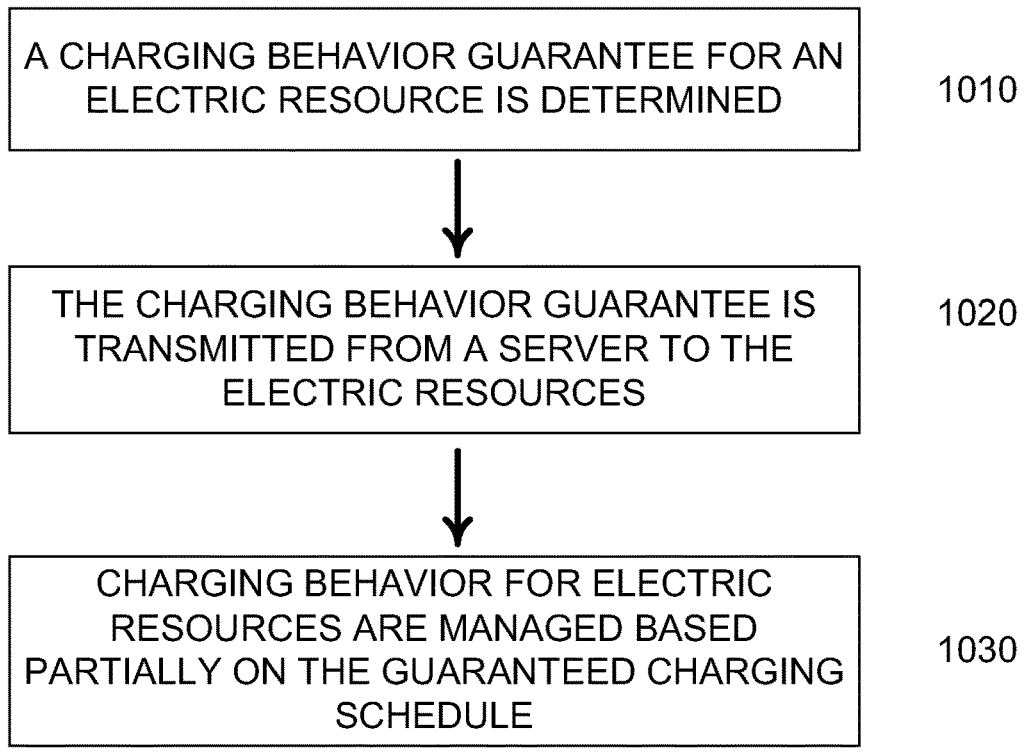
FIG. 10A is a flow chart of an example of a smart charging customer guarantee.

FIG. 10A shows an embodiment of a smart charging customer guarantee. A charging behavior guarantee is determined 1010 for an electric resource. The charging behavior guarantee comprises a guaranteed charging schedule that matches a regular charging schedule of the electric resource. The guaranteed charging schedule may provide for power flow flexibility. The charging behavior guarantee is transmitted 1020 from a server to the electric resources. The charging behavior for electric resources are managed 1030 based partially on the guaranteed charging schedule.

Smart Charging Via Periodically Updated Schedules

In some environments, it is desirable to implement a centrally managed smart charging system or program without requiring continuous, real-time communication between the endpoint device and the central server. In these situations, a periodically updated schedule is beneficial. Because such a schedule can be frequently updated by the central server, the disclosed system presents significant advantages over a simple timer system which delays charging to a fixed off-peak time. Such a schedule would be transmitted from the server to the vehicles or endpoints and would allow individual vehicles or endpoints to operate in an intelligent but disconnected manner.

In an embodiment, every resource in the power flow management system maintains a persistent, current schedule of default charging behavior. This schedule is periodically transmitted to the resource over a communications network.

The schedule, in one embodiment, defines average power-level constraints for resources during each fixed length interval over the period of the schedule. For example, a one-day schedule could be subdivided into 96 fifteen-minute time slots. The average power-level is defined as the percent of time during the slot that the resource can charge at its maximum charge power. For example, 33% average power-level signifies that the resource should charge at maximum power for five minutes of a fifteen-minute time slot. The energy consumption can also take place at 33% of maximum power for the entirety of the fifteen-minute slot.

Upon receiving an updated schedule from the server, the client immediately replaces its old schedule with the updated schedule. If the client's current operating mode is a pre-scheduled operation, the client can immediately enact the new schedule.

At a fixed period, the client can send an update to the central energy management server. The fixed period may be specified as part of the schedule. The update can specify information about its current state including information about current power-level, battery state-of-charge (SOC), and energy transferred during each of the time slots that have not been previously reported. When an energy session terminates without the client being able to communicate with the server, the information about energy consumption and battery SOC by time interval is stored until the information can be communicated to the energy management system.

Because the server would have detailed knowledge of the charging schedule being followed by each vehicle, the server could include scheduled vehicle behavior in electrical load planning, even though the vehicles were not in constant communication with the server.

Since such a schedule can be updated at regular intervals by the central server, this system presents significant advantages over a simple timer system that always delays charging to a fixed off-peak time. For example, if a large population of vehicles were each configured to charge at a particular off peak time, the sudden increase in load from multiple vehicles simultaneously beginning charging would constitute a new peak. Through the use of centrally managed individual schedules, each vehicle can be configured to begin charging at a different time, thereby eliminating the new peak.

Figure 10B:
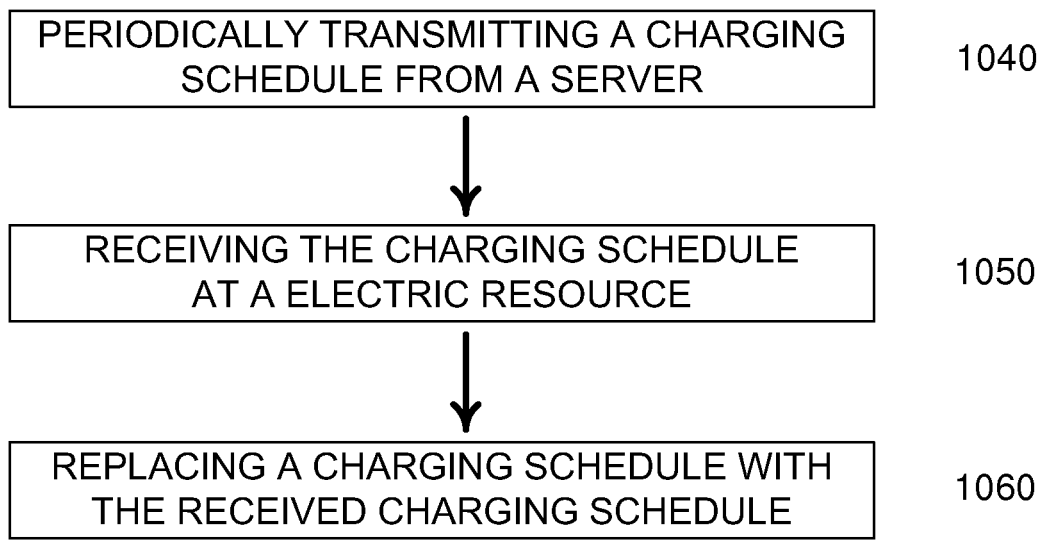
FIG. 10B is a flow chart of an example of smart charging via periodically updated schedules.

FIG. 10B shows an embodiment of smart charging via periodically updated schedules for a power management system. A charging schedule is periodically transmitted 1040 from a server. The charging schedule is received 1050 by a device, such as an electric vehicle. The charging schedule replaces 1060 the device's prior schedule.

In a system for managing electric resources with smart charging customer guarantees or for managing smart charging via periodically updated schedules, the charging behavior guarantee and the electrical loads may be determined by an energy management system, such as the power aggregation system 100 as shown in FIG. 1 and described above. The server may be the flow control server 106 of the flow control center 102.

Smart Charging Benefit Analysis

Energy management systems have been developed for controlling the power draw of distributed electrical loads, such as electric vehicles. Such systems use various methods, such as load interruption, load reduction, and reverse energy flow, to reduce the impact of the load on the electric grid and the local distribution infrastructure.

A component of evaluating such a system is understanding the specific benefit the system has provided. To facilitate such an understanding, an energy management system could produce a user-readable representation of the impact of the system. The energy management system could calculate key energy flow values and compare them to the baseline that would have occurred without the intervention of the system. Because the baseline behavior would not actually occur in the presence of an active energy management system, the system would necessarily calculate a synthetic baseline from available information.

By comparing the baseline to managed energy flow values, the energy management system can demonstrate the modification effected to the load curve, the reduction in peak power demand, and the amount of load that was controllable for various purposes.

In addition to past values, the energy management system can use scheduled and predicted values to generate this information for the future. This allows a graphical, tabular, or other representation of the benefits of the energy management system that extends into the past and future. An example view that is useful is the aggregate power drawn by a population of vehicles (and potentially other devices) over time, both actual past and future predicted given a particular smart charging regime in effect, and compare this to predicted past and future aggregate power given a different smart charging regime (such as unmanaged charging).

A backwards in time looking synthetic baseline can be created by taking the actual vehicle data in terms of time of plugin, state of charge at plugin, and so forth, and simulating the power flows that would have occurred under a different smart charging regime, or under unmanaged charging. Likewise, forwards in time looking synthetic baseline may be created by first using models that predict, per vehicle, the time and SOC at plugin, and duration of plugin, and then applying a given smart charging regime (possibly including unmanaged charging) to create a net power curve.

Smart Charging Via Schedule with Override

In some environments, it is be desirable to implement a centrally managed smart charging system or program where bandwidth utilization is minimized, but where real-time control of individual endpoints is still possible. In these situations, a periodically updated schedule with real-time override messages may be beneficial.

In this system, every resource in the power flow management system maintains a persistent, current schedule of default charging behavior. This schedule is periodically transmitted to the resource over a communications network. The schedule may represent the behavior that is, on average, beneficial in the local environment. For example, vehicles could be configured to charge slowly at peak times (perhaps 5:00-8:00 PM) and more rapidly and off peak times (perhaps 8:00 PM-2:00 AM).

While a schedule allows for charging behavior to be controlled without requiring continuous communications, a purely schedule-based system cannot address unpredictable grid or utility operational demands. While power capacity is generally in plentiful supply in the evening, unexpected events could cause a power shortage. Similarly, while power is usually in relatively short supply in the early evening, unexpected events could produce a surplus.

By issuing real-time override messages, the server has the ability to accommodate these unexpected "out of schedule" events. At times of surplus electricity, vehicles can be directed to increase energy consumption, at variance from their pre-programmed schedules. At times of energy shortage, vehicles can be directed to decrease energy consumption, at variance from their schedules. When energy availability is largely as predicted, no communication is required between the server and the endpoints/vehicles, even though the vehicles are following a generally beneficial smart charging schedule.

By selectively issuing real-time control messages, an energy management system can produce the effect of directly controlling an entire population of electric vehicles without directly communicating with each of them. Because the schedule transmitted to each vehicle is known by the optimization engine of the central energy management server, the scheduled behavior can be incorporated into the optimization process as if the vehicle was under direct control. Only necessary adjustment commands must be transmitted.

Figure 11A:
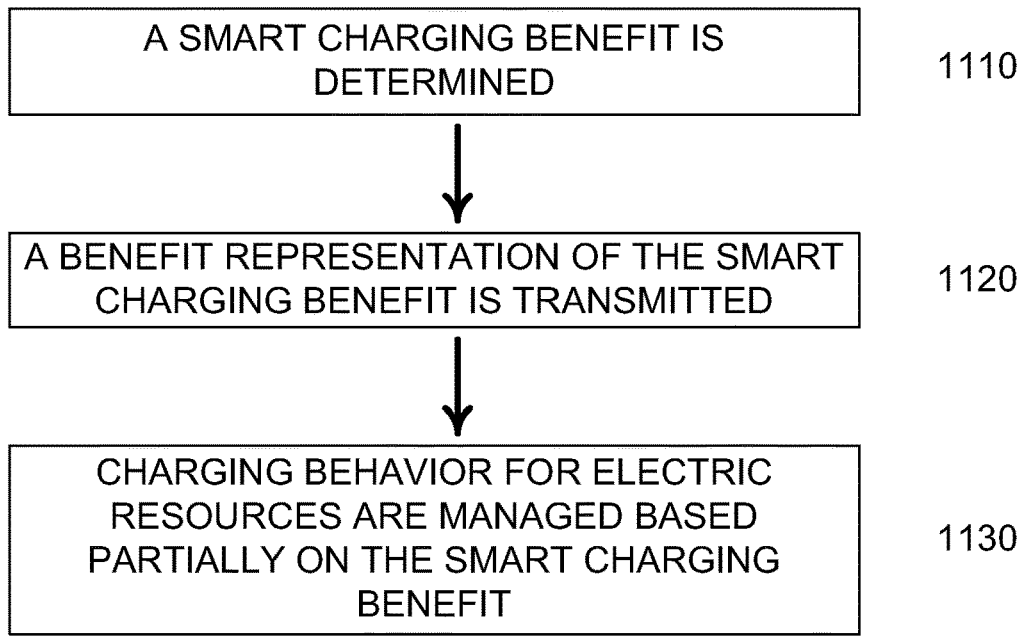
FIG. 11A is a flow chart of an example of a smart charging benefit analysis.

FIG. 11A shows an embodiment of a smart charging benefit analysis. A smart charging benefit is determined 1110. The smart charging benefit is provided by an energy management system which manages electric resources. The smart charging benefit results from the energy management system and benefits an electric resource. A benefit representation of the smart charging benefit is transmitted 1120 from a server to the electric resource. The charging behavior for electric resources are managed 1130 based partially on the smart charging benefit. In a system for managing electric resources via a smart charging benefit analysis, the smart charging benefit may be determined by an energy management system, such as the power aggregation system 100 as shown in FIG. 1 and described above. The server may be the flow control server 106 of the flow control center 102.

Figure 11B:
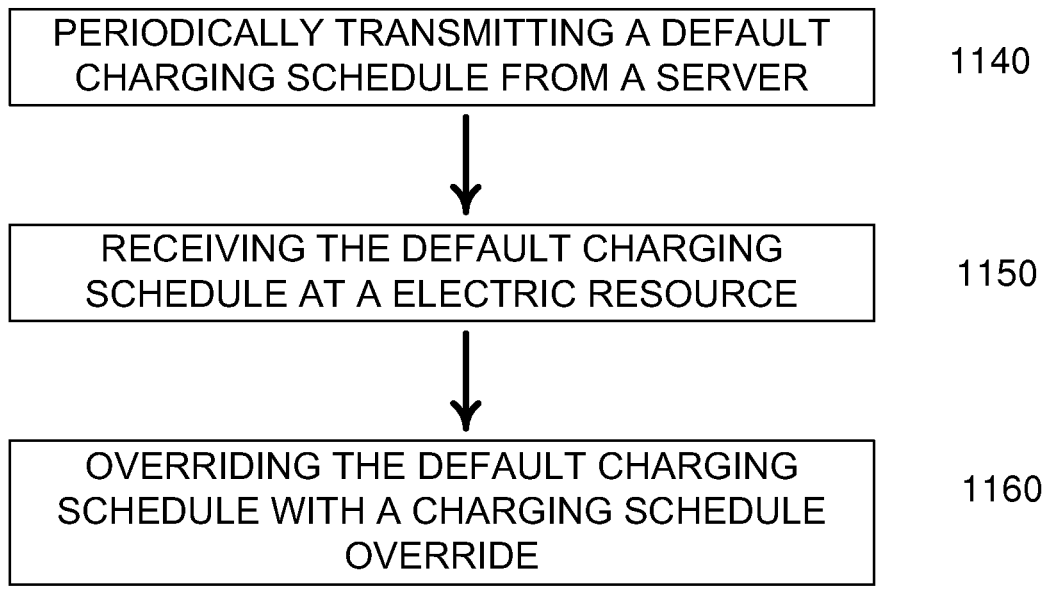
FIG. 11B is a flow chart of an example of smart charging via schedules with overrides.

FIG. 11B shows an embodiment of smart charging via schedules with overrides for a power management system. A default charging schedule is periodically transmitted 1140 from a server. The default charging schedule is received 1150 by a device, such as an electric vehicle. A charging schedule override is transmitted from the server and overrides 1160 the default charging schedule. In a system for managing smart charging via schedules with overrides, the electrical loads may be managed by a management system, such as the power aggregation system 100 as shown in FIG. 1 and described above. The server may be the flow control server 106 of the flow control center 102.

Local Load Management in the Presence of Uncontrolled Loads

Energy management systems control the power draw of distributed electrical loads, such as electric vehicles. One of the benefits of such an system is the management of power-draw on feeder or premises circuits. For example, ten charging stations are installed on a branch circuit that only has the capacity to support five vehicles running at maximum power. An energy management system can be used to ensure that the total power consumed does not exceed the capacity of the branch circuit, while ensuring that the branch circuit is used to its fullest when sufficient cars are attached.

Similarly, facilities that are subject to utility demand charge (a surcharge based on the peak power consumed by the facility) may wish to keep total power consumption below a particular threshold.

While an energy management system can achieve a particular total load target by regulating the power drawn by each load on a circuit or in a site, there are many situations wherein some loads on the site or circuit are not under the control of the energy management system. In an embodiment, the power level of such uncontrolled loads or resources may not be controllable or adjustable by the energy management system.

In this situation, the energy management system may still be able to achieve a load-level goal for the entire site, provided it has access to information about the uncontrolled loads. For example, when the energy management system has real-time access to the total power level for a site under management (from a meter), it can infer the amount of uncontrolled load currently present in the site. This calculation is performed by subtracting the load under management from the total load reported for the entire site.

The energy management system could then adjust the target of the portion of load under control to be equal to the difference between the total desired load level and the amount of uncontrolled load.

As the uncontrolled increased, the controlled loads would be reduced. As the uncontrolled loads decreased, the controlled loads would increase. The result would be that total load remains under control, while the electric vehicles representing controlled loads have access to as much power as possible.

Figure 12:
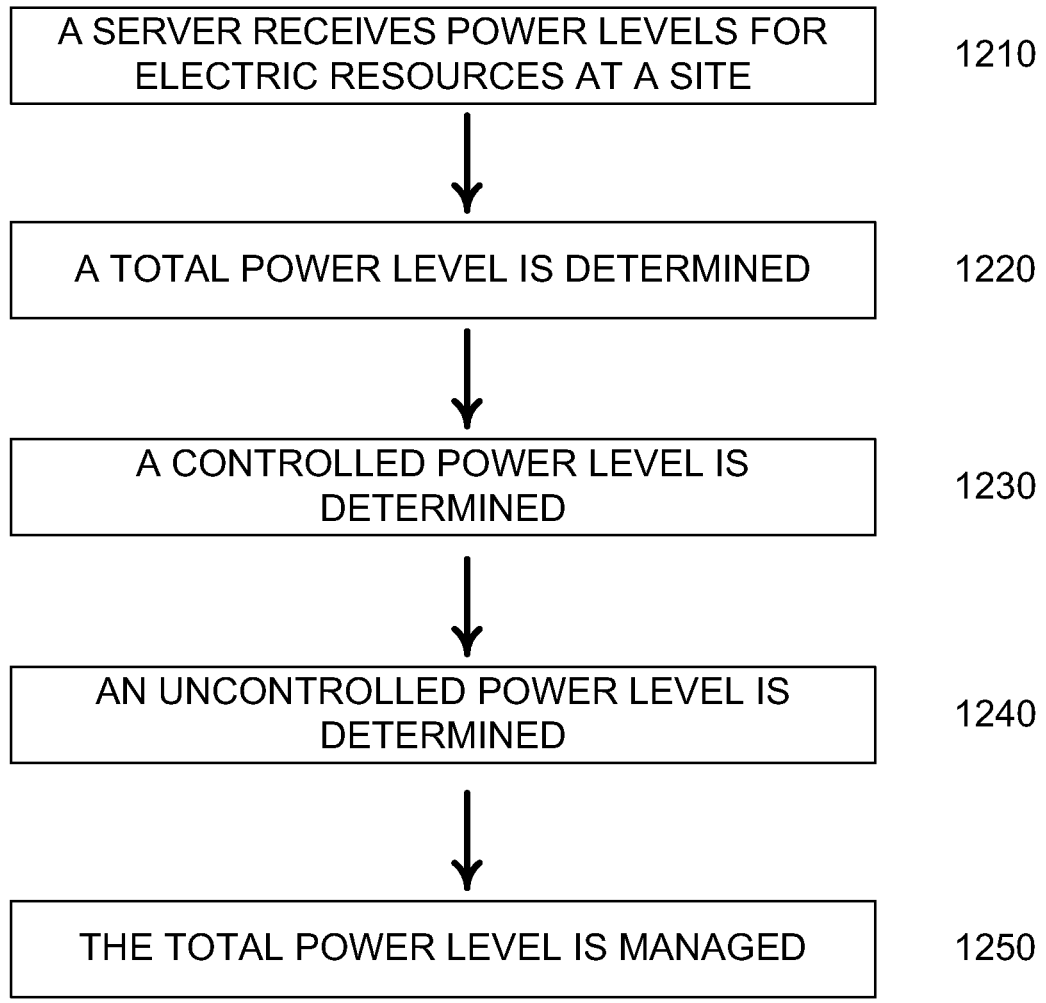
FIG. 12 is a flow chart of an example of local load management in the presence of uncontrolled loads.

FIG. 12 shows an embodiment of local load management in the presence of uncontrolled loads for a power management system. A server receives 1201 power levels for electric resources at a site comprising controlled electric resources and uncontrolled electric resources. The total power level is determined 1202 and the controlled power level for the controlled electric resources is determined 1203. Based on the total power level and the controlled power level, the uncontrolled power level for the uncontrolled electric is determined 1204. The total power level is managed 1205 for the electric resources based on the said determinations. The management step may be performed on a particular machine, such as a physical computing device.

In a system for local load management in the presence of uncontrolled loads, the total power level may be managed by a management system, such as the power aggregation system 100 as shown in FIG. 1 and described above. The server may be the flow control server 106 of the flow control center 102.

Direct Load Control Via Prices to Devices

A prices-to-devices method for managing distributed power resources is to broadcast the current energy price to all such devices. Each device can have configurable rules that determine their behavior given an energy price. For example, according to one rule, an electric vehicle is charged if the energy price is less than X.

A direct-control method for managing distributed power resources is to send specific behavior instructions to specific devices. For example, an electric vehicle is commanded to either be charged immediately or not to be charged right now.

Direct load control offers benefits above those possible with prices-to-devices models. These benefits include the ability to deterministically curtail load, and the ability to precisely match load to an external signal. The external signal may be an AGC or a grid stabilization signal, or a signal indicating the ability of renewable energy.

While direct-control offers operation benefits, there may exist environments where prices-to-devices enabled endpoints have been deployed, and it is not practical to upgrade or replace them. If direct load control is desired in such an environment, it is necessary to retrofit direct-control over the prices-to-devices protocol.

Direct-control can be layered over prices-to-devices by dynamically adjusting the price transmitted to a set of devices in a way that is disconnected from the actual price of electricity, but that will achieve the desired behavior. For example, if there is a spinning reserves call, such that there is a sudden requirement that an electricity shortage be quickly made up through load curtailment, a price signal can be sent to a set of devices that is high enough to cause an appropriate number of devices to curtail charging.

In some circumstances, the server may have knowledge of the specific rules used by the controlled devices to determine the at what prices they will initiate and terminate charging. In such a circumstance, the server may deterministically control the behavior of devices by sending price signals known to trigger the desired behavior in the controlled devices.

In other circumstances, the server may not have knowledge of the specific rules used by the controlled devices. If smart metering or other similar technologies are present in such a circumstance, the server may still accomplish direct load control through an iterative process. Specifically, the server could adjust the price sent to all devices, monitor the resulting adjustment in electrical load, and then calculate a subsequent adjustment to the price sent to all devices. Through a series of progressive price adjustments, the specific desired load profile could be realized.

Figure 13:
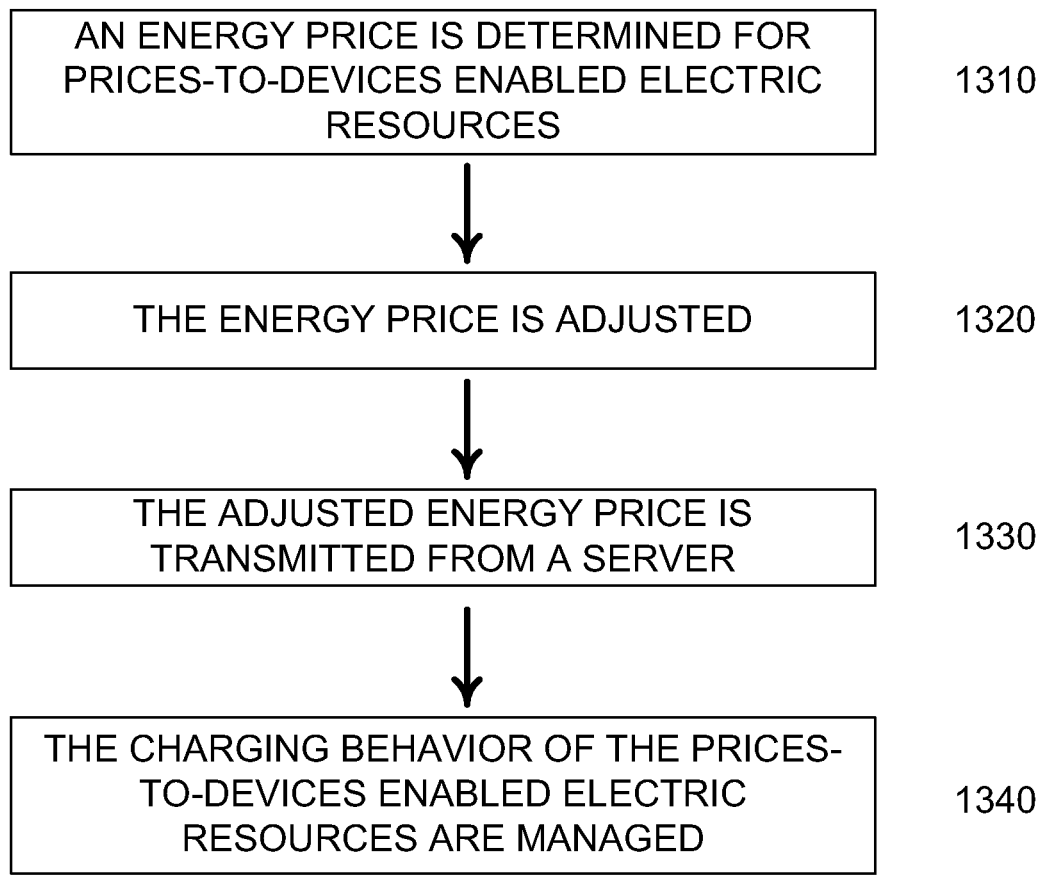
FIG. 13 is a flow chart of an example of direct load control over prices-to-devices enabled electric resources.

FIG. 13 shows an embodiment of direct load control via prices-to-devices for a power management system. An energy price is determined 1301 for electric resources comprising prices-to-devices enabled electric resources. The energy price is adjusted 1302 and transmitted 1303 from a server to a electric resource. The charging behavior of the prices-to-devices enabled electric resources are managed 1304.

In a system for managing electric resources with direct control over prices-to-devices enabled devices, the charging behavior may be managed by a management system, such as the power aggregation system 100 as shown in FIG. 1 and described above. The server may be the flow control server 106 of the flow control center 102. A system that uses a smart charging benefit analysis may also utilize smart charging customer guarantees, as described above.

CONCLUSION

Although systems and methods have been described in language specific to structural features and/or methodological acts, it is to be understood that the subject matter defined in the appended claims is not necessarily limited to the specific features or acts described. Rather, the specific features and acts are disclosed as examples of implementations of the claimed methods, devices, systems, etc. It will be understood by those skilled in the art that various changes in form and details may be made therein without departing from the spirit and scope of the invention.

What is claimed is:

1. A method for smart charging via periodically updated schedules comprising the steps:

determining, with a central server, an energy availability of a charging system;

determining, with the central server, a charging schedule of each of a plurality of electric resources coupled to the charging system, wherein the charging schedule defines average power-level constraints for each of the plurality of electric resources over a plurality of time intervals, and each average power-level constraint is based on a percent of time during a corresponding one of the plurality of time intervals that a corresponding one of the plurality of electric resources charges at maximum charge power;

periodically transmitting, from the central server, the charging schedule via a network to the plurality of electric resources, causing the plurality of electric resources to receive the charging schedule from the central server via the network, wherein the charging schedule instructs the plurality of electric resources to replace a prior charging schedule with the received charging schedule, and the prior charging schedule controlled charging behavior for the plurality of electric resources; and modifying, with an override message from the central server, the charging schedule for at least one of the plurality of electric resources when the energy availability of the charging system varies from an electrical load defined by the charging schedules of each of the plurality of electric resources, wherein the charging schedule causes the plurality of electric resources to consume energy during each time interval among the plurality of time intervals at a percent of the maximum charge power equal to or less than the percent of time during each time interval that the plurality of electric resources charge at the maximum charge power.

2. The method of claim 1, wherein the electric resources are distributed.

3. The method of claim 1, wherein the electric resources are electric vehicles.

4. The method of claim 1, further comprising receiving, with the central server, an update from one or more of the plurality of electric resources.

5. The method of claim 4, wherein the update includes, for each of the plurality of electric resources, information selected from the following: energy consumption, current power-level, battery state of charge, and energy transfers.

6. The method of claim 1, wherein the average power-level constraints are based on a fixed time interval over a time period of charging schedule.

7. The method of claim 1, wherein each of the plurality of time intervals is fixed.

8. The method of claim 1, further comprising:
causing the plurality of electric resources to enact the received charging schedule.

9. The method of claim 1, further comprising:
causing the plurality of electric resources to store unreported information in a database, wherein the unreported information is selected from a group consisting of the following: energy consumption, current power-level, battery state of charge, or energy transfers.

10. A method for smart charging via periodically updated schedules comprising the steps:
determining, with a central server, an energy availability of a charging system;
determining, with the central server, a charging schedule for each of a plurality of electric resources coupled to the charging system, wherein the charging schedule defines an average power-level constraint for a first electric resource of the plurality of electric resources, wherein determining the charging schedule is performed without first receiving a state-of-charge from the first electric resource, and the average power-level constraint is based on a percent of time during a time interval that the first electric resource charges at maximum charge power;
periodically transmitting, from the central server, the charging schedule via a network to the plurality of electric resources, including the first electric resource, causing the plurality of electric resources to receive the charging schedule from the central server via the network, wherein the charging schedule instructs the plurality of electric resources to replace a prior charging schedule with the received charging schedule, and the prior charging schedule controlled charging behavior for the plurality of electric resources; and
modifying, with the central server, the charging schedule for at least one of the plurality of electric resources when the energy availability of the charging system varies from an electrical load defined by the charging schedules for each of the plurality of electric resources, wherein the charging schedule causes the plurality of electric resources to consume energy during each time interval among a plurality of time intervals at a percent of the maximum charge power equal to or less than the percent of time during each time interval that the plurality of electric resources charge at the maximum charge power.

11. The method of claim 10, wherein the electric resources are distributed.

12. The method of claim 10, wherein the electric resources are electric vehicles.

13. The method of claim 10, further comprising receiving, with the central server, an update from one or more of the plurality of electric resources, wherein the update includes, for each of the plurality of electric resources, information selected from the following: energy consumption, current power-level, battery state of charge, and energy transfers.

14. The method of claim 10, wherein the charging schedule provides charging behavior for each one of the plurality of electric resources.

15. The method of claim 10, wherein the time interval is fixed.

16. The method of claim 10, further comprising:
causing the plurality of electric resources to enact the received charging schedule.

17. The method of claim 10, further comprising:
causing the plurality of electric resources to store unreported information in a database, wherein the unreported information is selected from a group consisting of the following: energy consumption, current power-level, battery state of charge, or energy transfers.

18. The method of claim 10, wherein the charging schedule defines average power-level constraints for a plurality of electric resources over a plurality of time intervals.

* * * * *